(12) United States Patent
Hubbard et al.

(10) Patent No.: US 12,394,007 B2
(45) Date of Patent: Aug. 19, 2025

(54) PEER-TO-PEER PICK GENERATION AND PLACEMENT

(71) Applicant: Rebet, Inc., Sammamish, WA (US)

(72) Inventors: Carson Vaughn Hubbard, Sammamish, WA (US); Edwin Omondi Onyango, Hanover, NH (US)

(73) Assignee: Rebet, Inc., Sammamish, WA (US)

( * ) Notice: Subject to any disclaimer, the term of this patent is extended or adjusted under 35 U.S.C. 154(b) by 0 days.

(21) Appl. No.: 19/030,062

(22) Filed: Jan. 17, 2025

(65) Prior Publication Data

US 2025/0209559 A1   Jun. 26, 2025

Related U.S. Application Data

(63) Continuation of application No. 18/988,594, filed on Dec. 19, 2024.

(60) Provisional application No. 63/649,815, filed on May 20, 2024, provisional application No. 63/613,557, filed on Dec. 21, 2023.

(51) Int. Cl.
*G06Q 50/34* (2012.01)
*G06Q 50/00* (2012.01)
*G07F 17/32* (2006.01)

(52) U.S. Cl.
CPC ............. *G06Q 50/34* (2013.01); *G06Q 50/01* (2013.01); *G07F 17/3279* (2013.01); *G07F 17/3288* (2013.01)

(58) Field of Classification Search
CPC .. G06Q 50/34; G07F 17/3279; G07F 17/3288
See application file for complete search history.

(56) References Cited

U.S. PATENT DOCUMENTS

| | | | | |
|---|---|---|---|---|
| 5,575,474 A * | 11/1996 | Rossides | ................ | G06Q 50/34 463/26 |
| 6,443,841 B1 * | 9/2002 | Rossides | ................ | F21V 25/00 463/16 |
| 8,088,000 B2 * | 1/2012 | Ginsberg | ............ | G07F 17/3251 463/25 |
| 8,167,309 B1 * | 5/2012 | Laut | ...................... | G07F 17/326 273/250 |
| 8,221,225 B2 * | 7/2012 | Laut | ...................... | G06Q 30/00 463/25 |
| 8,419,544 B2 * | 4/2013 | McNutt | ............... | G07F 17/3288 463/25 |
| 9,406,196 B2 * | 8/2016 | Asher | ................ | G07F 17/3288 |

(Continued)

*Primary Examiner* — Chase E Leichliter
(74) *Attorney, Agent, or Firm* — Knobbe, Martens, Olson & Bear, LLP

(57) ABSTRACT

An event picking system that can process a challenge event pick is described herein. For example, the event picking system can request, via a first user device, a first user to select an event pick market and to select event pick terms for the event pick market to create a challenge event pick. The event picking system can generate user interface data that displays an invitation for a second user to accept the challenge event pick when rendered on a second user device. The event picking system can determine, via a concurrency resolution system, that the challenge event pick has been or has not been accepted by a different user. The event picking system can update the placed pick data store to include an acceptance flag data in association with the challenge event pick if the challenge event pick has not been accepted by a different user.

20 Claims, 9 Drawing Sheets

(56) References Cited

U.S. PATENT DOCUMENTS

| | | | |
|---|---|---|---|
| 10,453,311 B2* | 10/2019 | Hall | G07F 17/3288 |
| 10,515,516 B1* | 12/2019 | Eckman | G07F 17/3288 |
| 11,069,195 B2* | 7/2021 | Joao | G07F 17/3211 |
| 11,087,596 B2* | 8/2021 | Nelson | G07F 17/3258 |
| 2002/0198051 A1* | 12/2002 | Lobel | G07F 17/32 463/42 |
| 2004/0058731 A1* | 3/2004 | Rossides | G06Q 50/34 463/42 |
| 2004/0128157 A1* | 7/2004 | Aquilino | G06Q 30/02 463/25 |
| 2007/0060380 A1* | 3/2007 | McMonigle | G07F 17/3288 463/42 |
| 2013/0029765 A1* | 1/2013 | Parks | A63F 13/46 463/42 |
| 2014/0011575 A1* | 1/2014 | Neubauer | G06Q 50/34 463/25 |
| 2014/0141871 A1* | 5/2014 | Barclay | G06Q 50/01 463/25 |
| 2014/0194188 A1* | 7/2014 | Kosta | G07F 17/3279 463/25 |
| 2017/0358173 A1* | 12/2017 | Mccafferty | G07F 17/3239 |
| 2019/0244485 A1* | 8/2019 | Jones | G07F 17/3274 |
| 2020/0151842 A1* | 5/2020 | O'Brien | G07F 17/3276 |
| 2020/0175818 A1* | 6/2020 | Joao | G07F 17/3276 |
| 2022/0198879 A1* | 6/2022 | Brown | G06Q 20/381 |
| 2024/0153349 A1* | 5/2024 | Finding | H04L 9/50 |

\* cited by examiner

PEER-TO-PEER PICK GENERATION AND PLACEMENT

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. For example, this application is a continuation of U.S. Non-Provisional application Ser. No. 18/988,594, filed Dec. 19, 2024, entitled "PEER-TO-PEER PICK GENERATION AND PLACEMENT" which claims the benefit of U.S. Provisional Application No. 63/613,557, filed Dec. 21, 2023, entitled "SPORTS BETTING PLATFORM," and of U.S. Provisional Application No. 63/649,815, filed May 20, 2024, entitled "SPORTS BETTING PLATFORM," the entire content of each of which is incorporated by reference herein and made a part of this specification for all purposes.

BACKGROUND

Spectators of an event may wish to enhance the event experience by picking on a particular outcome of the event. Providing a digital interface on a user device, such as a mobile device, for the spectators to place picks on event outcomes can improve the picking experience for the spectators. Digital picking platforms exist that provide spectators with picking markets for different types of events. Conventional digital picking platforms, however, suffer from several technical deficiencies that result in an inefficient platform and a diluted user experience.

SUMMARY

The systems, methods, and devices described herein each have several aspects, no single one of which is solely responsible for its desirable attributes. Without limiting the scope of this disclosure, several non-limiting features will now be discussed briefly.

One aspect of the present disclosure provides an event pick duplication system for duplicating a first event pick placed at a first time. The event pick duplication system comprises memory storing computer-executable instructions. The event pick duplication system further comprises a hardware processor in communication with the memory, wherein the computer-executable instructions, when executed by the hardware processor, cause the hardware processor to: process a request to generate a second event pick that is a duplicate of the first event pick; determine that odds of pick terms of the first event pick placed at the first time have changed at a second time after the first time; in response to the determination that the odds of the pick terms of the first event pick have changed at the second time; generate second pick terms with the changed odds; generate user interface data that, when rendered by a user device, causes the user device to display a user interface that depicts a data field that identifies the second event pick as having the second pick terms, wherein the data field comprises a data entry field configured for a user to enter a number of pick entries, in response to a confirmation of a placement of the second event pick; store data associated with the second event pick in a placed pick data store; and adjust user entries data in a user entries data store based on a value entered into the data entry field.

The event pick duplication system of the preceding paragraph can include any sub-combination of the following features: where the computer-executable instructions, when executed, further cause the hardware processor to determine that the odds of the pick terms of the first event pick have changed using current odds data from an odds feed provided by an odds provider; where the computer-executable instructions, when executed, further cause the hardware processor to: in response to rendering the user interface data on the user device, subscribe to the current odds data in the odds feed provided by the odds provider in association with the duplicate pick terms; where the computer-executable instructions, when executed, further cause the hardware processor to determine that the odds of the pick terms of the first event pick have changed using risk management data provided by a managed trading service and the current odds data; where the user interface comprises a user interface element, and where the request to generate the second event pick that is the duplicate of the first event pick is generated in response to the user interacting with the user interface element; and where the computer-executable instructions, when executed, further cause the hardware processor to: publish the placement of the second event pick on a social feed of a second user that follows the user that placed the second event pick.

Another aspect of the present disclosure relates to a computer-implemented method for duplicating a first event pick placed at a first time. The computer-implemented method further comprises: as implemented by one or more computing devices configured with specific computer-executable instructions, processing a request to generate a second event pick that is a duplicate of the first event pick; determining that odds of pick terms of the first event pick placed at the first time have changed at a second time after the first time; in response to the determination that the odds of the pick terms of the first event pick have changed at the second time, generating a second pick terms with the changed odds; generating user interface data that, when rendered by a user device, causes the user device to display a user interface that depicts a data field that identifies the second event pick as having the second pick terms, wherein the data field comprises a data entry field configured for a user to enter a number of pick entries; and adjusting user entries data in a user entries data store based on a value entered into the data entry field.

The computer-implemented method of the preceding paragraph can include any sub-combination of the following features: where determining that odds of pick terms of the first event pick have changed further comprises determining that the odds of the pick terms of the first event pick have changed using current odds data from an odds feed provided by an odds provider; where duplicating the first event pick further comprises: in response to rendering the user interface data on the user device, subscribing to the current odds data in the odds feed provided by the odds provider in association with the duplicate pick terms; where determining that odds of pick terms of the first event pick have changed further comprises determining that the odds of the pick terms of the first event pick have changed using risk management data provided by a managed trading service and the current odds data; where the user interface comprises a user interface element, and where the request to generate the second event pick that is the duplicate of the first event pick is generated in response to the user interacting with the user interface element; where duplicating the first event pick further comprises: publishing a placement of the second event pick on a social feed of a second user that follows the user that placed the second event pick; where duplicating the first event pick further comprises: in response to a confirmation of a placement of the second event pick, storing data associated with the second event pick in a placed pick data store.

Another aspect of the disclosure provides non-transitory, computer-readable storage media comprising computer-executable instructions for generating a duplicate pick of a first event pick placed at a first time where the computer-executable instructions, when executed by a computer system, cause the computer system to: process a request to generate a second event pick that is a duplicate of the first event pick; determine that odds of pick terms of the first event pick placed at the first time have changed at a second time after the first time; in response to the determination that the odds of the pick terms of the first event pick have changed at the second time, generate a second pick terms with the changed odds; generate user interface data that, when rendered by a user device, causes the user device to display a user interface that depicts a data field that identifies the second event pick as having the second pick terms, wherein the data field comprises a data entry field configured for a user to enter a number of pick entries; and adjust user entries data in a user entries data store based on a value entered into the data entry field.

The non-transitory, computer-readable storage media of the preceding paragraph can include any sub-combination of the following features: where the computer-executable instructions, when executed, further cause the computer system to determine that the odds of the pick terms of the first event pick have changed using current odds data from an odds feed provided by an odds provider; where the computer-executable instructions, when executed, further cause the computer system to: in response to rendering the user interface data on the user device, subscribe to the current odds data in the odds feed provided by the odds provider in association with the duplicate pick terms; where the computer-executable instructions, when executed, further cause the computer system to determine that the odds of the pick terms of the first event pick have changed using risk management data provided by a managed trading service and the current odds data; where the user interface comprises a user interface element, and where the request to generate the second event pick that is the duplicate of the first event pick is generated in response to the user interacting with the user interface element; where the computer-executable instructions, when executed, further cause the computer system to: publish a placement of the second event pick on a social feed of a second user that follows the user that placed the second event pick; and where the computer-executable instructions, when executed, further cause the computer system to: in response to a confirmation of a placement of the second event pick, store data associated with the second event pick in a placed pick data store.

Another aspect of the present disclosure provides an event picking system. The event picking system comprises memory storing computer-executable instructions. The event picking system further comprises a hardware processor in communication with the memory, wherein the computer-executable instructions, when executed by the hardware processor, cause the hardware processor to: request, via a first user device, a first user to select an event pick market and to select event pick terms for the event pick market to create a challenge event pick; in response to selection of the event pick market and the event pick terms, store data associated with the challenge event pick in a placed pick data store; generate user interface data that, when rendered by a second user device, causes the second user device to display a user interface depicting an invitation for a second user to accept the challenge event pick; in response to an acceptance by the second user of the challenge event pick, determine, via a concurrency resolution system, that the placed pick data store does not comprise acceptance flag data in association with the challenge event pick; in response to the determination that the placed pick data store does not comprise the acceptance flag data in association with the challenge event pick, update the placed pick data store to include the acceptance flag data in association with the challenge event pick; and adjust entries data of the first user and of the second user based on the event pick terms of the challenge event pick.

The event picking system of the preceding paragraph can include any sub-combination of the following features: where the concurrency resolution system caches an indication that the acceptance flag data is stored in association with the challenge event pick in a cache local to the concurrency resolution system; where the computer-executable instructions, when executed, further cause the hardware processor to: in response to an acceptance by a third user of the challenge event pick, query the local cache to determine whether the acceptance flag data is stored in association with the challenge event pick in the paced pick data store; where the indication stored in the local cache is stored for a threshold period of time, and where the computer-executable instructions, when executed, further cause the hardware processor to: delete the indication stored in the local cache in response to the indication being stored in the local cache for the threshold period of time; where the computer-executable instructions, when executed, further cause the hardware processor to: request, via the first user device, the first user to one of send the invitation for the second user to accept the challenge event pick directly to the second user or publish the invitation for the second user to accept the challenge event pick on a social feed of a follower of the first user; and where a first user identifier associated with the first user is included in data associated with the challenge event pick stored in the placed pick data store, and where the computer-executable instructions, when executed, further cause the hardware processor to: in response to updating the placed pick data store to include the acceptance flag data in association with the challenge event pick, update the data associated with the challenge event pick stored in the placed pick data store to include a second user identifier associated with the second user.

Another aspect of the present disclosure relates to a computer-implemented method. The computer-implemented method further comprises: as implemented by one or more computing devices configured with specific computer-executable instructions, requesting, via a first user device, a first user to select an event pick market and to select event pick terms for the event pick market to create a challenge event pick; in response to selection of the event pick market and the event pick terms, generating user interface data that, when rendered by a second user device, causes the second user device to display a user interface depicting an invitation for a second user to accept the challenge event pick; in response to an acceptance by the second user of the challenge event pick, determining, via a concurrency resolution system, that a placed pick data store does not comprise acceptance flag data in association with the challenge event pick; in response to the determination that the placed pick data store does not comprise the acceptance flag data in association with the challenge event pick, updating the placed pick data store to include the acceptance flag data in association with the challenge event pick; and adjusting entries data of the first user and of the second user based on the event pick terms of the challenge event pick.

The computer-implemented method of the preceding paragraph can include any sub-combination of the following features: where the concurrency resolution system caches an indication that the acceptance flag data is stored in association with the challenge event pick in a cache local to the concurrency resolution system; where the method further comprises: in response to an acceptance by a third user of the challenge event pick, querying the local cache to determine whether the acceptance flag data is stored in association with the challenge event pick in the placed pick data store; where the indication stored in the local cache is stored for a threshold period of time, and where the method further comprises: deleting the indication stored in the local cache in response to the indication being stored in the local cache for the threshold period of time; where the method further comprises: requesting, via the first user device, the first user to one of send the invitation for the second user to accept the challenge event pick directly to the second user or publish the invitation for the second user to accept the challenge event pick on a social feed of a follower of the first user; wherein the method further comprises: in response to selection of the event pick market and the event pick terms, storing data associated with the challenge event pick in a placed pick data store; and where a first user identifier associated with the first user is included in data associated with the challenge event pick stored in the placed pick data store, and wherein the method further comprises: in response to updating the placed pick data store to include the acceptance flag data in association with the challenge event pick, updating the data associated with the challenge event pick stored in the placed pick data store to include a second user identifier associated with the second user.

Another aspect of the disclosure provides non-transitory, computer-readable storage media comprising computer-executable instructions where the computer-executable instructions, when executed by a computer system, cause the computer system to: request, via a first user device, a first user to select an event pick market and to select event pick terms for the event pick market to create a challenge event pick; in response to selection of the event pick market and the event pick terms, generate user interface data that, when rendered by a second user device, causes the second user device to display a user interface depicting an invitation for a second user to accept the challenge event pick; in response to an acceptance by the second user of the challenge event pick, determine, via a concurrency resolution system, that a placed pick data store does not comprise acceptance flag data in association with the challenge event pick; in response to the determination that the placed pick data store does not comprise the acceptance flag data in association with the challenge event pick, update the placed pick data store to include the acceptance flag data in association with the challenge event pick; and adjust entries data of the first user and of the second user based on the event pick terms of the challenge event pick.

The non-transitory, computer-readable storage media of the preceding paragraph can include any sub-combination of the following features: where the concurrency resolution system caches an indication that the acceptance flag data is stored in association with the challenge event pick in a cache local to the concurrency resolution system; where the computer-executable instructions, when executed, further cause the computer system to: in response to an acceptance by a third user of the challenge event pick, query the local cache to determine whether the acceptance flag data is stored in association with the challenge event pick in the placed pick data store; where the indication stored in the local cache is stored for a threshold period of time, and wherein the computer-executable instructions, when executed, further cause the computer system to: delete the indication stored in the local cache in response to the indication being stored in the local cache for the threshold period of time; where the computer-executable instructions, when executed, further cause the computer system to: request, via the first user device, the first user to one of send the invitation for the second user to accept the challenge event pick directly to the second user or publish the invitation for the second user to accept the challenge event pick on a social feed of a follower of the first user; where the computer-executable instructions, when executed, further cause the computer system to: in response to selection of the event pick market and the event pick terms, store data associated with the challenge event pick in a placed pick data store; and where a first user identifier associated with the first user is included in data associated with the challenge event pick stored in the placed pick data store, and where the computer-executable instructions, when executed, further cause the computer system to: in response to updating the placed pick data store to include the acceptance flag data in association with the challenge event pick, update the data associated with the challenge event pick stored in the placed pick data store to include a second user identifier associated with the second user.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
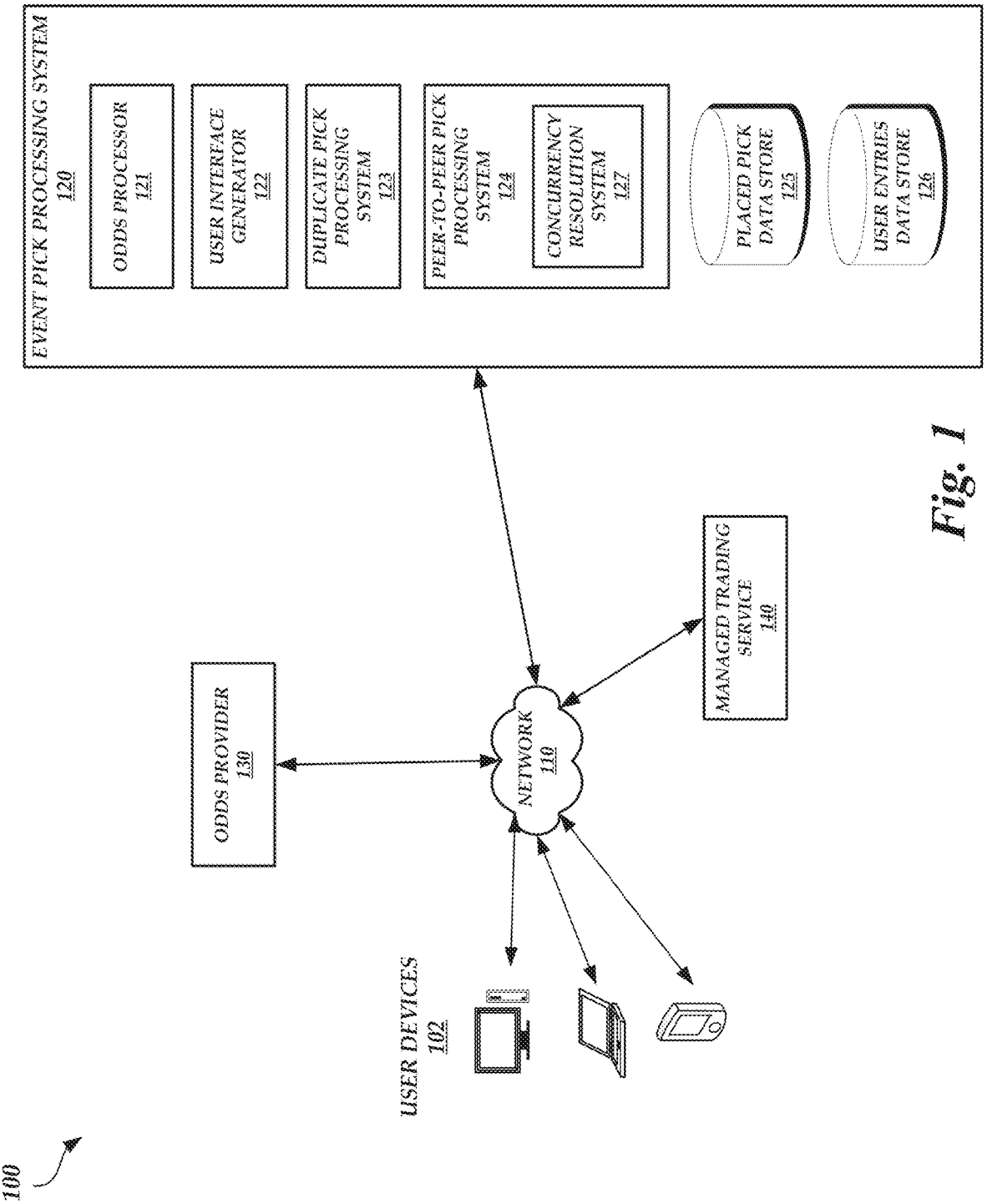
FIG. 1 is a block diagram of an illustrative operating environment in which an event pick processing system uses odds data, risk assessment data, pick terms and/or the like to place a user pick on a desired event.

As described above, conventional digital picking platforms suffer from several technical deficiencies. For example, conventional digital picking platforms lack mechanisms to provide users with a seamless and optimized combination of event picking and dynamic social experiences, both with respect to the user experience and the underlying server efficiency. In particular, many types of events (e.g., sporting events, award ceremonies, political events, reality entertainment competitions, sweepstakes etc.) are inherently social experiences. It may be desirable to further enhance the social experience by providing a system for spectators (e.g., users) to place picks (e.g., predicting the outcome of an event) on the event with which other users may interact. For example, a user may want to rally behind and support a pick that another user has placed. Alternatively, a user may want to challenge another user to a pick based on the outcome of an event. Providing an enhanced social experience for events with event picking can be problematic for conventional digital picking platforms because such platforms lack mechanisms or algorithms to facilitate seamless and efficient dynamic social experiences through event picking without requiring servers of the conventional digital picking platforms to perform unnecessary and/or duplicative operations.

As an illustrative example, some conventional digital picking platforms require a first user who may wish to place the same pick that a second user (e.g., a friend or an acquaintance) has placed to perform a series of steps to recreate the pick. With conventional digital picking platforms, the first user may search the digital picking platform for the second user's account or profile to find the pick that the first user wants to also pick. The first user may then navigate through a plethora of different screens and/or user interfaces (e.g., request multiple pages from the conventional digital picking platform's server) containing various events and markets that the first user is not interested in to find the events and markets contained in the second user pick that the first user wishes to copy. Not only is this a tedious user experience, but it also creates unnecessary traffic flow for the conventional digital picking platform server given that the first user is requesting an excess number of pages, thereby reducing the conventional digital picking platform server's available network bandwidth. To service the first user's multiple page requests, the server may generate user interface data and display the user interface data on the first user's user device for a multitude of events and markets the user is not interested in as well as retrieve odds data for those events and markets to display on the user device while the first user searches for the events and markets contained in the second user pick. This can deteriorate conventional digital picking platform server efficiency and ability to service other user requests.

Accordingly, described herein is an event pick processing system for a digital picking platform that runs operations that can overcome the technical deficiencies of conventional digital picking platforms without utilizing the amount of computing resources (e.g., processor usage, memory usage, network bandwidth usage, etc.) generally used by a conventional digital picking platform server. For example, the event pick processing system can aggregate picks placed by various users and provide a user interface to a user that depicts picks placed by other users. Picks placed by other users may be organized (e.g., in a particular portion of the user interface, in a particular page, in a particular tab, etc.) such that the user can navigate to and see picks placed by other users with a minimal number of navigational steps (e.g., one or two navigational steps to view the user interface portion, page, tab, etc. that depicts picks placed by other users). Upon viewing picks placed by one or more other users, a user can instruct the event pick processing system to place a duplicate pick that is a duplicate of a first pick placed by another user. A user can interact with the first pick placed by another user-which can be displayed to the user on a user device in a user interface-to send a request to the event pick processing system to place a duplicate pick that is a duplicate of the first pick. The event pick processing system can then process the request to generate the duplicate pick. In this way, the event pick processing system described herein allows users to duplicate picks without using an excess amount of computing resources given that the number of navigational steps taken by a user, and therefore the number of page requests submitted by the user, is significantly reduced.

The event pick processing system can determine whether odds of pick terms of the first pick placed by the other user at a first time have changed at a second time after the first time when the user is attempting to duplicate the pick. In response to determining that the odds of the pick terms of the first pick have changed at the second time, the event pick processing system can generate duplicate pick terms with the changed odds. Otherwise, the event pick processing system can generate duplicate pick terms with the same odds. The event pick processing system can then generate user interface data that, when rendered by the user device, can cause the user device to display a user interface that may depict a data field that may identify the duplicate pick as having the duplicate pick terms. The data field may comprise a data entry field configured for the user to enter a number of pick entries.

In response to rendering the user interface data on the user device and while waiting for user input into the data entry field, the event pick processing system can subscribe to an odds feed provided by an odds provider that is associated with the markets indicated in the duplicate pick terms. Monitoring all the odds for all the markets may involve the event pick processing system receiving odds data for each set of odds that have changed and storing or processing the information for use in constructing picks. Given that there may be many odds associated with many different markets, the amount of computing resources that the event pick processing system would have to allocate to receiving, storing, and/or processing the odds data could overwhelm the event pick processing system and reduce the amount of computing resources available to generating and processing placed picks, among other tasks. By subscribing to the odds feed, however, the event pick processing system can listen for only changes to odds that are associated with a market indicated in user-selected pick terms (e.g., the duplicate pick terms). In other words, the event pick processing system can ignore (e.g., decline to receive, process, and/or store) odds data that correspond to markets other than those indicated in user-selected pick terms. In this way, the event pick processing system can reduce the amount of computing resources used to monitor odds without experiencing a situation in which certain odds changes relevant to the event pick processing system are missed. In response to a confirmation of a placement of the duplicate pick, the event pick processing system may adjust user entries data in a user entries data store based on a value entered into the data entry field.

In addition, the event pick processing system described herein may provide a digital picking platform that allows users to engage in a peer-to-peer picking experience (e.g., a pick with binary outcomes where a first user picks a first outcome and a second user picks a second outcome) that is optimized to reduce server traffic. For example, a first user may select, in response to a request on a first user device, a pick market and select pick terms for the pick market to create a peer-to-peer pick. The event pick processing system may then generate user interface data that, when rendered by a second user device, may cause the second user device to display a user interface depicting an invitation for a second user to accept the peer-to-peer pick. In response to an acceptance by the second user of the peer-to-peer pick, the event pick processing system can determine with a concurrency resolution system whether a placed pick data store does or does not comprise acceptance flag data in association with the peer-to-peer pick. In response to the determination that the placed pick data store does not comprise acceptance flag data in association with the peer-to-peer pick, the event pick processing system can update the placed pick data store to include the acceptance flag data in association with the peer-to-peer pick. The event pick processing system can then adjust entries data of the first user and of the second user based on the pick terms of the peer-to-peer pick. Otherwise, if the placed pick data store does already comprise acceptance flag data in association with the peer-to-peer pick, the event pick processing system can inform the second user via the second user device that the peer-to-peer pick has already been accepted and cancel acceptance of the peer-to-peer pick by the second user.

The concurrency resolution system used by the event pick processing system can reduce unnecessary server traffic, and specifically mitigate the likelihood that the event pick processing system performs duplicative operations. For example, without the concurrency resolution system, the event pick processing system may update entries data upon a second user's acceptance of the peer-to-peer pick to deduct entries from the second user's entries amount and generate and transmit user interface data to the second user device that, when rendered by the second user device, causes the second user device to display a user interface that indicates the deduction from the second user's entries amount. If it turns out that the peer-to-peer pick had previously been accepted by a third user (and therefore the acceptance of the peer-to-peer pick by the second user is invalid), then the event pick processing system may have to perform an additional operation to reverse the update to the entries data to restore the second user's entries amount to the correct amount. Thus, the event pick processing system may unnecessarily update entries data, generate user interface data, and reverse the entries data update. Given that the event pick processing system may be servicing a large number of users (e.g., 10,000 users, 100,000 users, 1,000,000 users, etc.), the number of unnecessary operations performed by the event pick processing system can grow substantially and prevent the event pick processing system from performing other necessary operations in a timely manner. The concurrency resolution system, however, can use the acceptance flag data check to prevent the event pick processing system from unnecessarily updating entries data, generating user interface data, and/or reversing the entries data update in situations in which a user accepts a peer-to-peer pick that had actually previously been accepted. As a result, the event pick processing system can maintain a low level of latency for operations that are otherwise necessary for the event pick processing system to implement the functionality described herein.

The foregoing aspects and many of the attendant advantages of this disclosure will become more readily appreciated as the same become better understood by reference to the following detailed description, when taken in conjunction with the accompanying drawings.

Example Event Pick Processing System

FIG. 1 is a block diagram of an illustrative operating environment 100 in which an event pick processing system 120 uses odds data, risk assessment data, picking trend data and/or the like to allow users of a digital picking platform to engage is a dynamic social picking experience. The operating environment 100 further includes an odds provider 130 and a managed trading service 140 that may each communicate with the event pick processing system 120 via a network 110 to provide the odds data, the risk assessment data, the picking trend data and/or the like. Furthermore, the operating environment 100 includes various user devices 102 that may communicate with the event pick processing system 120 to request a duplicate pick, to request a peer-to-peer pick, and/or to engage in a similar dynamic social picking experience.

The event pick processing system 120 can be a computing system having memory storing computer-executable instructions and one or more hardware processors in communication with the memory, where the computer-executable instructions, when executed by the one or more hardware processors, cause the hardware processor(s) to provide a user of a digital picking platform with a dynamic social picking experience, for example, by placing a duplicate pick or a peer-to-peer pick. The event pick processing system 120 may be a single computing device, or it may include multiple distinct computing devices, such as computer servers, logically or physically grouped together to collectively operate as a server system. The components of the event pick processing system 120 can each be implemented in application-specific hardware (e.g., a server computing device with one or more ASICs) such that no software is necessary, or as a combination of hardware and software. In addition, the modules and components of the event pick processing system 120 can be combined on one server computing device or separated individually or into groups on several server computing devices. In some embodiments, the event pick processing system 120 may include additional or fewer components than illustrated in FIG. 1.

In some embodiments, the features and services provide by the event pick processing system 120 may be implemented as web services consumable via the communication network 110. In further embodiments, the event pick processing system 120 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As used herein, an "event" refers to any specific contest or activity (e.g., a football game between team Purple and team Black can be an event). As used herein, a "market" refers to a category or type of picks that a user can place for a given event (e.g., an over/under on points scored during the game between team Purple and team Black can be a market for the team Purple vs. team Black event). As used herein, "odds" or "pick odds" refer to the likelihood that an outcome of a market will occur and can be used to determine how many credits should be received by the picker (e.g., user) based on a specific number of entries entered for the market if the outcome occurs. As used herein, "pick terms" refers to the details and/or conditions of a pick. For example, the pick terms of a pick can include the event and market of the event the pick is placed on, the outcome selected for the market, and/or the odds associated with the selected outcome. Although the term "pick" is used herein to describe the choice of an outcome for a market, the term is not meant to be limiting. For example, the event pick processing system 120 described herein may enable a user to place a bet to choose an outcome for a market instead of a pick. Whether a user places a bet or a pick, the event pick processing system 120 can implement any or all of the functionality described herein. If a user places a bet instead of a pick, the term "bet" may substitute for the term "pick" in the discussion of the functionality of the event pick processing system 120 described herein. Although the term "entry" or "entries" is used herein to describe a type of consideration one uses to make picks, the term is not meant to be limiting. For example, the event pick processing system 120 described herein may enable a user to enter a wager instead of an entry, where a wager can be in the form of real currency (e.g., United States Dollar, Euro, Yuan, etc.) or artificial currency (e.g., pick credits, digital funds, points, etc.). Whether a user enters a wager or an entry, the event pick processing system 120 can implement any or all of the functionality described herein. If a user enters a wager instead of an entry, the term "wager" may substitute for the term "entry" in the discussion of the functionality of the event pick processing system 120 described herein. As an illustrative example, the event pick processing system 120 described herein may enable a user to place a bet on an outcome and wager an amount of money.

The event pick processing system 120 may include various modules, components, data stores, and/or the like to provide the dynamic social picking experiences described herein. For example, the event pick processing system 120 may include an odds processor 121, a user interface generator 122, a duplicate pick processing system 123, a peer-to-peer pick processing system 124 comprising a concurrency resolution system 127, a placed pick data store 125 and a user entries data store 126.

The odds processor 121 can determine the odds for a particular event and/or market at a given time. For example, a user device 102 or another component of the event pick processing system 120 may submit to the odds processor 121 a request for real-time odds associated with an event and/or market. In response, the odds processor 121 can obtain from the odds provider 130 odds data (e.g., data indicating current market odds for moneyline picks, over/under picks, spread picks, player props, parlay odds, and/or similar types of picks) associated with the requested event(s) and/or market(s). The odds processor 121 can also obtain risk management data (e.g., data indicating current aggregate liabilities for a specific event and/or market) from the managed trading service 140.

The odds processor 121 can then use the obtained data to provide the user with the current odds at which the user can place a pick for the desired event and/or market. For example, for a football game between team Purple and team Black, a user may be interested in placing a moneyline pick on team Purple. Upon request, the odds processor 121 can retrieve odds data for the moneyline pick on team Purple for the associated event from the odds provider 130. The odds processor 121 can then retrieve risk management data associated with a moneyline pick on team Purple for the associated event from the managed trading service 140. The odds processor 121 can then use the retrieved risk management data to modify the odds data for the moneyline pick on team Purple as to, for example, minimize liability on the digital picking platform provider.

The odds processor 121 can provide the current odds to the duplicate pick processing system 123. The duplicate pick processing system 123 can be used by a user to engage with a first pick placed by a different user. The user can interact with the first pick-which can be displayed to the user on a user device-to send a request to the duplicate pick processing system 123 to place a duplicate pick which can be a duplicate of the first pick. The duplicate pick processing system 123 can then process the request to generate a duplicate pick. The duplicate pick processing system 123 can then determine with the odds processor 121 the current odds of the first pick as described herein. If the current odds of the pick terms of the first pick have changed, the duplicate pick processing system 123 can then generate user interface data with the user interface generator 122 that, when rendered by the user device 102, can cause the user device 102 to display a user interface that may depict a data field, for example, a pick sleeve that identifies the duplicate pick as having the current odds (which are different from the original odds for the pick terms of the first pick at the time the first pick was placed). If the current odds of the pick terms of the first pick have not changed, the duplicate pick processing system 123 can instead generate user interface data with the user interface generator 122 that, when rendered by the user device 102, can cause the user device 102 to display a user interface that may depict a pick sleeve that identifies the duplicate pick as having the same odds for the pick terms of the first pick. The pick sleeve can comprise a data entry field configured for the user to enter, for example, a desired number of pick entries, the numerical value of which may be the same or may be different than the numerical value of the pick entries of the first pick. In some embodiments, the odds processing system 123 can then, in response to a confirmation to place the duplicate pick, adjust user entries data in the user entries data store 126 based on the numerical value entered into the data entry field and store data associated with the duplicate pick in the placed pick data store 125.

In some embodiments, while the user interface on the user device 102 is displaying the data entry field and waiting for user input into the data entry field, the duplicate pick processing system 123 can subscribe in the odds feed provided by the odds provider 130 to the markets indicated in the duplicate pick terms in order to listen only to odds changes to those markets pending confirmation of the duplicate pick. As described above, by subscribing to a portion of the odds fee corresponding to the pick terms (and therefore by not listening to odds changes in markets that are not included in the pick terms), performance and efficiency of the event pick processing system 120 can be improved.

In further embodiments, the event pick processing system 120 or an external system, not shown, can train an odds machine learning model using machine learning training data to enhance the odds data outputted by the duplicate pick processing system 123 and/or provided by the odds provider 130 and/or the managed trading service 140. The machine learning training data can comprise training data elements. Each training data element can be labelled with information that the trained odds machine learning model can use to make predictions on odds changes. For example, the trained odds machine learning model can proactively update the odds, which may reduce processing operations executed by the event pick processing system 120 (e.g., reduce the number of operations performed by the event pick processing system 120 to process odds data obtained from the odds provider 130 and/or managed trading service 140). A training data element can, for example, include a number of users who have duplicated a previous pick over a period of time labeled with an indication of how odds changed, if at all, in response to the pick duplications. Alternatively or in addition, a training data element can include a geographic location of users who have duplicated a previous pick labeled with an indication of how odds changed, if at all, in response to the pick duplications. Once trained, the odds processor 121 could provide as an input to the trained odds machine learning model an indication of the number of users who have duplicated the first pick and/or an indication of a geographic location of users who have duplicated the first pick, which may cause the trained odds machine learning model to output a prediction of how odds may change in the future given the first pick duplications. The duplicate pick processing system 123 can then use the predicted odds in the pick sleeve.

The event pick processing system 120 or external system can train one odds machine learning model for all geographic regions and/or types of users (e.g., where a user may be associated with a particular type based on the user's demographic information, pick type preferences, pick volume, and/or the like), or train multiple odds machine learning models that are each specific to a particular geographic region or type of user. If multiple odds machine learning models are trained, the event pick processing system 120 may use the odds machine learning model associated with a particular user's geographic location and/or type when determining how to update the odds for that particular user.

The peer-to-peer pick processing system 124 can be used by a user to initiate a dynamic social picking experience in the form of, for example, a peer-to-peer pick in which a first user challenges a second user to pick on the opposite outcome of an event and/or market that the first user wishes to place a pick on. When a first user initiates a peer-to-peer pick, the peer-to-peer pick processing system 124 can request the first user through a first user device 102A to select an event and/or a market for the peer-to-peer pick. In response to the selection of the event and/or market, the peer-to-peer pick processing system 124 may generate user interface data with the user interface generator 122 that, when rendered by a second user device 102B, causes the second user device 102B to display a user interface depicting an invitation for a second user to accept the peer-to-peer pick and enter into the pick terms of the peer-to-peer pick with the first user. In response to an acceptance of the peer-to-peer pick by the second user, the peer-to-peer pick processing system 124 can determine whether the peer-to-peer pick can be accepted by the second user with one or more concurrency resolution systems 127. The concurrency resolution system(s) 127 can check the placed pick data store 125 for acceptance flag data associated with the peer-to-peer pick. If the concurrency resolution system(s) 127 detects acceptance flag data in association with the peer-to-peer pick in the placed pick data store 125, which may, for example, indicate that the peer-to-peer pick has already been accepted by a different user and can no longer be accepted by the second user, then the peer-to-peer pick processing system 124 can generate user interface data with the user interface generator 122 that, when rendered by the second user device 102B, causes the second user device 102B to display a user interface indicating to the second user that the peer-to-peer pick cannot be accepted. If the concurrency resolution systems(s) 127 does not detect acceptance flag data in association with the peer-to-peer pick in the placed pick data store 125, then the peer-to-peer pick processing system 124 can update the placed pick data store to include the acceptance flag data in association with the peer-to-peer pick. In some embodiments, the peer-to-peer pick processing system 124 can then, in response to updating the placed pick data store to include the acceptance flag data in association with the peer-to-peer pick, adjust first user entries data and second user entries data in the user entries data store 126 based on the pick terms and can store data associated with the peer-to-peer pick in the placed pick data store 125.

In further embodiments, the event pick processing system 120 or an external system, not shown, can train a peer-to-peer machine learning model to predict which users are more likely to accept a peer-to-peer pick and as a result move a peer-to-peer pick that is posted to following users' social feeds (discussed in greater detail herein) to the top or near the top (e.g., within a first 2, 3, 4, 5, etc. postings) of the social feed of those users who the model predicts are more likely to accept the peer-to-peer pick. Alternatively or in addition, the event pick processing system 120 or the external system can also train a peer-to-peer recommendation machine learning model to make suggestions to a user on how to modify pick terms of a peer-to-peer pick to increase the likelihood that the peer-to-peer pick is accepted, which can be useful to a user if, after some period of time, the peer-to-peer pick initiated by the user has not been accepted. The machine learning training data for training the peer-to-peer machine learning model can comprise training data elements, where each training data element can include characteristics of a user (e.g., geographic location, age, demographic information, team preferences, pick type preferences (e.g., moneyline, spread, prop, etc.), market preferences, event preferences, number of entriest preferences, etc.) and peer-to-peer picks presented to the user and be labelled with an indication of peer-to-peer picks accepted by the user. The machine learning training data for training the peer-to-peer recommendation machine learning model can comprise training data elements, where each training data element can include information about a previous peer-to-peer pick and be labelled with an indication of whether the previous peer-to-peer pick was accepted by another user.

The event pick processing system 120 or external system can train one peer-to-peer machine learning model for all geographic regions and/or types of users (e.g., where a user may be associated with a particular type based on the user's demographic information, pick type preferences, pick volume, and/or the like), or train multiple peer-to-peer machine learning models that are each specific to a particular geographic region or type of user. If multiple peer-to-peer machine learning models are trained, the event pick processing system 120 may use the peer-to-peer machine learning model associated with a particular user's geographic location and/or type when determining how to organize the particular user's feed. Similarly, the event pick processing system 120 or external system can train one peer-to-peer recommendation machine learning model for all geographic regions and/or types of users (e.g., where a user may be associated with a particular type based on the user's demographic information, pick type preferences, pick volume, and/or the like), or train multiple peer-to-peer recommendation machine learning models that are each specific to a particular geographic region or type of user. If multiple peer-to-peer recommendation machine learning models are trained, the event pick processing system 120 may use the peer-to-peer recommendation machine learning model associated with a particular user's geographic location and/or type when recommending to the user how to update the user's peer-to-peer pick.

Once trained, the peer-to-peer pick processing system 124 could provide as an input to the trained peer-to-peer machine learning model characteristics of a user and available peer-to-peer picks that are yet to be accepted, which may cause the peer-to-peer machine learning model to output a likelihood (e.g., a score) that the user would accept one or more of the peer-to-peer picks. The peer-to-peer pick processing system 124 can use the likelihood score(s) to rank the available peer-to-peer pick(s) and place the available peer-to-peer pick(s) in ranked order in a user interface presented to the user. Once trained, the peer-to-peer pick processing system 124 could provide as an input to the trained peer-to-peer recommendation machine learning model a peer-to-peer pick that has yet to be accepted, which may cause the trained peer-to-peer recommendation machine learning model to output an indication of how to change the pick terms of the peer-to-peer pick to increase the likelihood that the peer-to-peer pick is accepted. The peer-to-peer pick processing system 124 can then automatically or in response to a user confirmation update the pick terms of the peer-to-peer pick and re-post the updated peer-to-peer pick on the social feeds of one or more other users.

While the present disclosure describes the user interface generator 122 as being able to generate user interface data that can depict a data field (e.g., a pick sleeve that identifies a duplicate pick or that can depict an invitation for a second user to accept a peer-to-peer pick), these are not meant to be limiting. For example, the user interface generator 122 can also generate user interface data that can depict conventional digital picking platform features, such as, sportsbooks, live event data and statistics, and active promotions and contests. The user interface generator 122 can also generate user interface data that can depict a social feed for sharing and interacting with picks (described in greater detail herein).

As described above, the placed pick data store 125 can store placed pick data. While the placed pick data store 125 is depicted as being located internal to the event pick processing system 120, this is not meant to be limiting. For example, not shown, the placed pick data store 125 can be located external to the event pick processing system 120.

As described above, the user entries data store 126 can store user entries data. While the user entries data store 126 is depicted as being located internal to the event pick processing system 120, this is not meant to be limiting. For example, not shown, the user entries data store 126 can be located external to the event pick processing system 120.

The odds provider 130 can be an outside odds provider that can provide current (e.g., up-to-date) odds information on multiple events and markets through a real-time odds feed. The odds provided by the odds provider 130 can be used by the odds processor 121 to determine odds to offer users. The odds provider 130 can be an application programming interface (API) service, implemented by a server or another hardware-based computing system, a data store, and/or the like. While the odds provider 130 is depicted as being located external to the event pick processing system 120, this is not meant to be limiting. For example, not shown, the odds provider 130 can be located internal to the event pick processing system 120.

The managed trading service 140 can be an outside managed trading service that can provide risk management data on prospective picks. The risk management data provided by the managed trading service 140 can be used by the odds processor 121 to determine odds to offer users. The managed trading service 140 can be an API service, implemented by a server or another hardware-based computing system, a data store, and/or the like. While the managed trading service 140 is depicted as being located external to the event pick processing system 120, this is not meant to be limiting. For example, not shown, the managed trading service 140 can be located internal to the event pick processing system 120.

Example Block Diagram for Generating a Duplicate Pick

Figure 2:
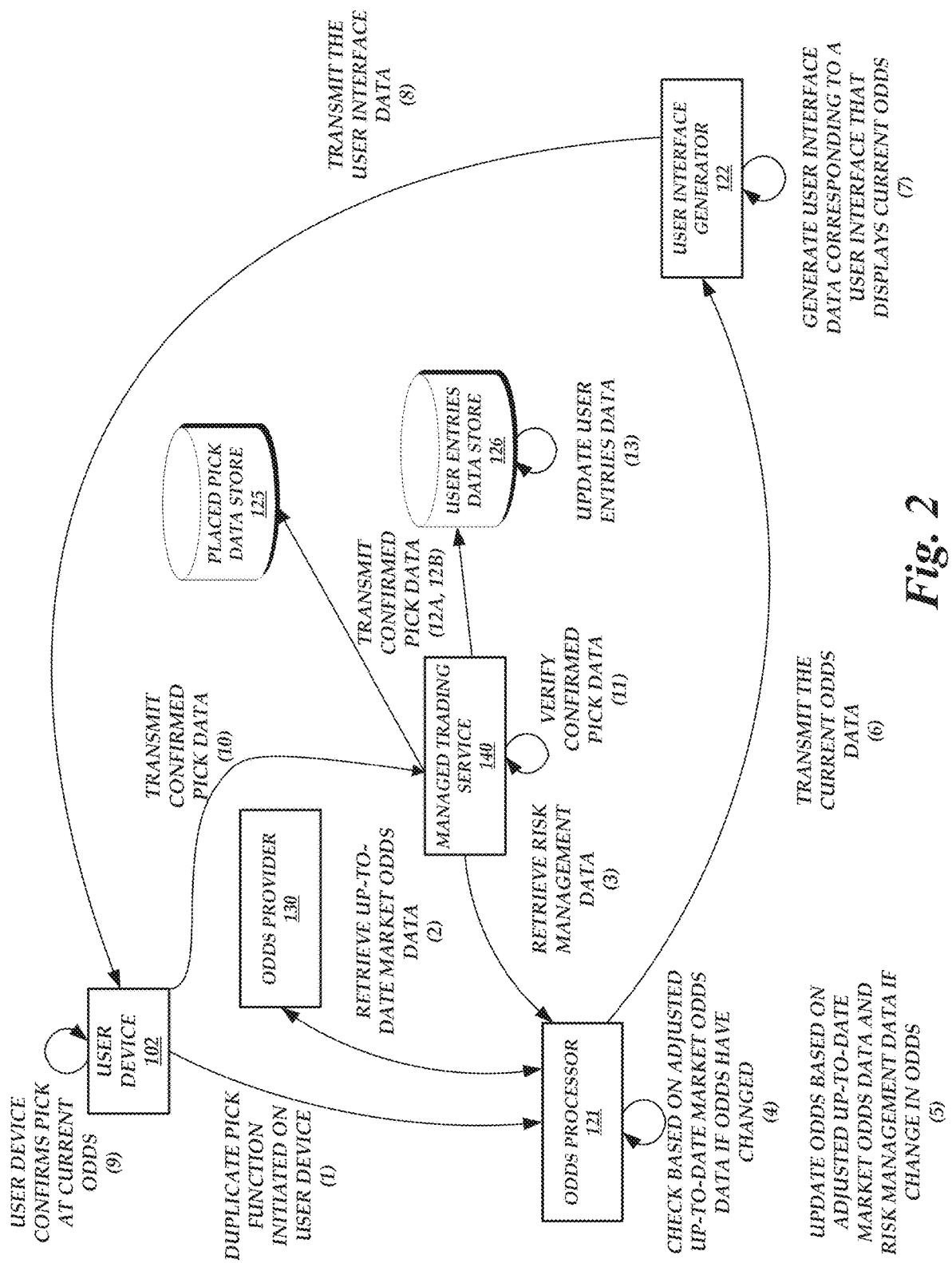
FIG. 2 is a flow diagram illustrating the operations performed by the components of the operating environment of FIG. 1 to generate data for a duplicate event pick that is a duplicate of a first event pick.

FIG. 2 is a flow diagram illustrating an example set of operations performed by the components of the operating environment 100 of FIG. 1 to generate a duplicate pick of a first placed pick with pick terms via the duplicate pick processing system 123. As illustrated in FIG. 2, a user with a user device 102 initiates the duplicate pick processing system 123 by an interaction with a first placed pick at (1). The interaction can be, for example, the user selecting on the user device 102 a duplicate pick button 202 or other user interface element (e.g., a drop down menu, a slider, a tab, an icon, a link, etc.) (discussed in greater detail herein) associated with a first placed pick. By interacting with the first placed pick, the duplicate pick processing system can determine the specific events and/or markets and associated picking terms that the duplicate pick processing system 123 may duplicate and verify. In some embodiments, the duplicate pick processing system 123 may retrieve the specific events and/or markets and associated picking terms by querying relational databases and data tables where event data relationships are stored, which are stored in a local cache (e.g., local to the event pick processing system 120) on the front end.

Upon initiation of the duplicate pick processing system 123, the duplicate pick processing system can call upon the odds processor 121 to verify the pick terms, for example, the pick odds of the specific events and/or markets associated with the first placed pick, and which are to be duplicated for the duplicate pick. The odds processor 121 can retrieve current (e.g., up-to-date) market odds from the odds provider 130 at (2). The odds provider 130 can be, for example, an odds feed that is streamed to a bookmaker in real time provided by a third-party odds provider or can be, for example, the bookmaker's in-house odds data. The odds processor 121 can also retrieve risk management data from the managed trading service 140 at (3). The managed trading service 140 can be, for example, risk management data from a third-party used by the bookmaker to minimize liability and increase gross gaming revenue or can be risk management data generated in-house. Although FIG. 2 depicts the odds processor first retrieving up-to-date market odds data from the odds provider 130 at (2) then retrieving risk management data from the managed trading service 140 at (3), it can be appreciated that this not need be the case and the collection of retrieving up-to-date market odds data from the odds provider 130 and retrieving risk management data from the managed trading service 140 can occur in any order and even at the same time.

After retrieving the up-to-date market odds data from the odds provider 130 and the risk management data from the managed trading service 140, the odds processor 121 can check based on the up-to-date market odds data if the odds data associated with the events and/or markets of the first placed pick have changed from when the first placed pick was placed at a first time to the time of the request to the duplicate pick processing system 123 to duplicate the first placed pick at (4). If the odds data has changed, the odds processor 121 can then update the odds data associated with the events and/or markets of the first placed pick based on the up-to-date market odds data and the risk management data at (5). If the odds data has not changed, then the odds processor 121 may not update the odds data. In some embodiments, even if the up-to-date market odds data does not indicate that the odds data associated with the events and/or markets of the first placed pick have changed, the odds processor may still update the odds data at (5) based on the risk management data.

Optionally, and not shown in the drawings, the odds processor 121 can use the trained odds machine learning model to set and/or update the odds data. For example, the odds processor 121 can use the trained odds machine learning model to set and/or update the odds data before operation (5) is performed, after operation (5) is performed, and/or in place of operations (4) and/or (5).

After the odds processor 121 has checked if the odds data has changed and updated the odds data accordingly, the odds processor 121 can transmit current odds data representing the current odds the bookkeeper will offer a user for the events and/or markets associated with the first placed pick to the user interface generator 122 at (6). The user interface generator 122 can generate user interface data that, when rendered by the user device 102, causes the user device 102 to display a user interface depicting the current odds at (7). This user interface can be, for example, a data field in the form of a pick sleeve prefilled with the pick terms associated with the first placed pick and the current odds. In some embodiments, the prefilling of the data field with the terms associated with the first placed pick can be facilitated by frontend code in the user interface, which can pull data from the server cache (e.g., a cache of the event pick processing system 120) and can format it appropriately in the pick sleeve. The pick sleeve can include a data entry field configured for the user to enter, for example, a number of entries for the pick terms indicated in the pick sleeve. This user interface data can be transmitted to the user 102 at (8) so that the user can enter the desired number of entries in the data entry field. Thus, with a single user interaction with a first placed pick, the user can now place a duplicate pick of the first placed pick with the same pick terms as the first pick updated for any odds changes with a number of entries of the user's preference or comfort level. In some embodiments, a dynamic adjustment script can update the user interface data based on a number of entries entered in the data entry field that, when rendered by the user device 102, can cause the user device 102 to display real-time changes and recalculations of a potential number of entries the user can receive for a successful pick based on the entered number of entries. After entering a number of entries by the user, the user can confirm placing the duplicate pick and be bound by its terms at (9). In some embodiments, the user may use an adjustment interface provided by the user interface generator 122 that can allow the user to adjust one or more of the pick terms associated with the pick displayed in the pick sleeve other than the number of entries to submit. The adjustment interface can use variations of one or more frontend libraries to update pick terms in the pick sleeve in real-time based on user selection and/or event pick processing system 120 constraints. As an illustrative example, the adjustment interface uses variations of frontend libraries compatible with REACT NATIVE to update pick terms in the pick sleeve in real-time based on user selection and/or event pick processing system 120 constraints.

In some embodiments, while the user interface on the user device 102 is displaying the data field and waiting for user input into the data entry field, the duplicate pick processing system 123 can subscribe in the odds feed provided by the odds provider 130 to the markets indicated in the duplicate pick terms in order to listen only to odds changes to those markets in the odds feed pending confirmation of the duplicate pick. This can improve performance and efficiency of the event pick processing system 120 by not listening to odds changes in markets that are not included in the pick terms.

After user confirmation of the duplicate pick, confirmed pick data containing pick terms data of the duplicate pick can be transmitted to the managed trading service 140 at (10) to verify the pick at (11) and confirm that the bookkeeper will enter into the pick.

In some embodiments, after the confirmed pick data has been verified by the managed trading service 140, the confirmed pick data can be transmitted to the placed pick data store 125 at (12A) to store in the event pick processing system 120 the confirmed pick data. The confirmed pick data can additionally or alternatively be sent to the user entries data store 126 at (12B), which can update user entries data based on the confirmed pick data 126 at (13). In some embodiments, if the pick data cannot be verified due to one or a number of reasons (e.g., regulatory restrictions, insufficient funds, data mismatches, etc.), the user interface generator 122 can generate user interface data that, when rendered by the user device 102, can cause the user device to display to the user an error message. In this case, the user may still access other event pick processing system 120 functionalities.

In some embodiments (not shown), the user interface generator 122 can generate user interface data that, when rendered by the user device 102, causes the user device 102 to display a user interface depicting the change in the user entries data. For example, prior to placing the duplicate pick, a user interface displayed on the user device 102 may have indicated to the user and user entries as containing 500 available entries. If the user submitted 50 entries on the duplicate pick, user interface data may cause the user device 102 to display the user entries as containing 450 available entries.

In some embodiments, the event pick processing system 120 may incorporate geolocation verification which can utilize a geolocation API to ascertain the user's current location. Data corresponding to the user's location can be used by the event pick processing system 120 for the purpose of verifying a pick placed by the user in that location. The event pick processing system 120 can use this data to control where users may initiate a pick and to restrict users from placing picks in locations where it may not be permitted.

Example Block Diagram for Generating a Peer-to-Peer Pick

Figure 3:
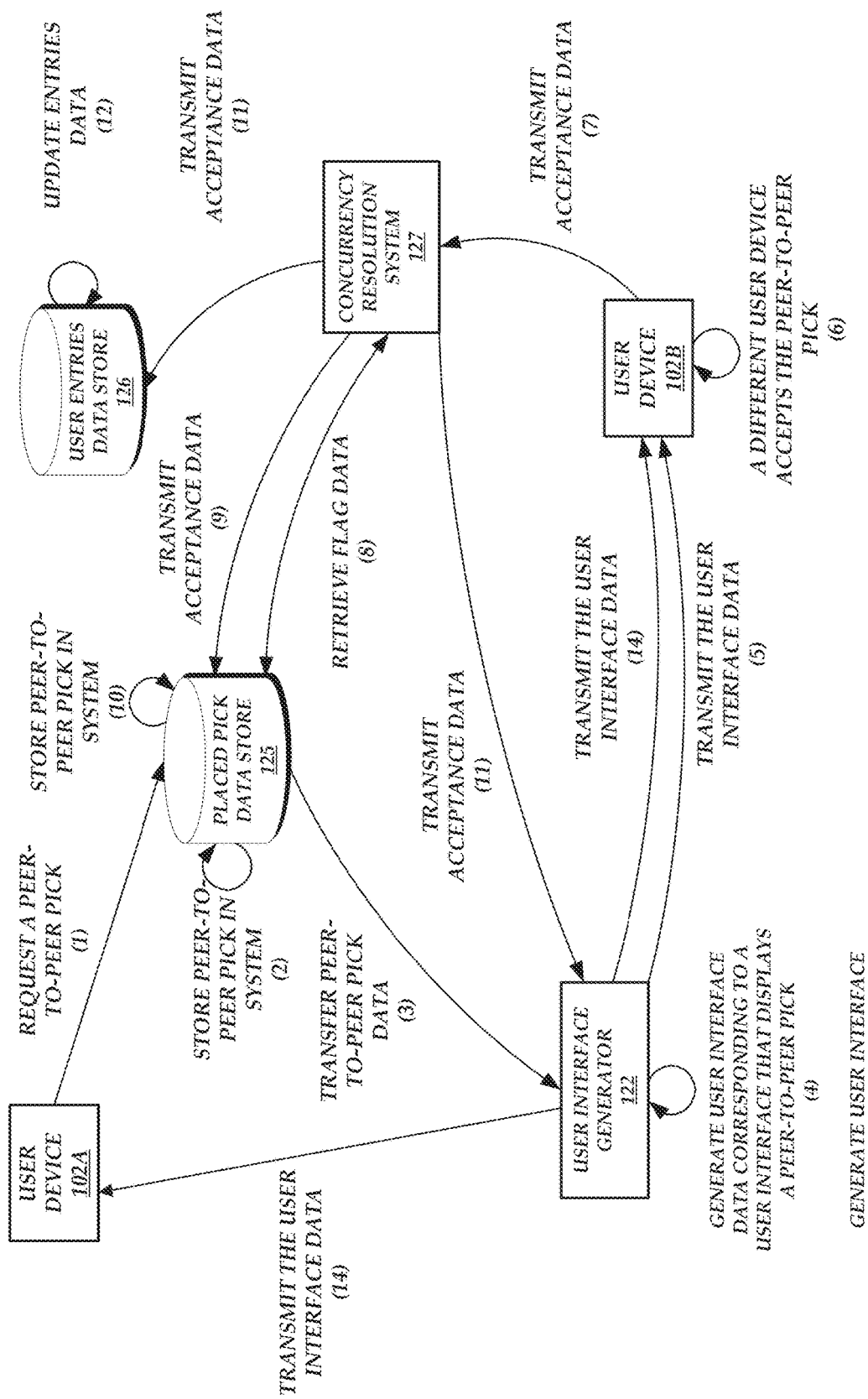
FIG. 3 is another flow diagram illustrating the operations performed by the components of the operating environment of FIG. 1 to generate a peer-to-peer pick.

FIG. 3 is a flow diagram illustrating an example set of operations performed by the components of the operating environment 100 of FIG. 1 to generate and enter two users into a peer-to-peer pick via the peer-to-peer pick processing system 124. As illustrated in FIG. 3, a first user with a first user device 102A initiates the peer-to-peer pick processing system 123 by requesting a peer-to-peer pick at (1). When requesting a peer-to-peer pick, the first user may be asked to choose an event and/or market for the peer-to-peer pick and to select pick odds and a number of entries for the peer-to-peer pick. The first user may be requested to pick another user to be part of the peer-to-peer pick. Additionally and/or alternatively, the first user may be requested to choose to publish the peer-to-peer pick such that "followers" of the first user can see an invitation to the peer-to-peer pick on their social feed (described in further detail herein).

Upon requesting a peer-to-peer pick with the peer-to-peer pick processing system 124, in some embodiments the peer-to-peer pick data may be stored in the placed pick data store at (2). The peer-to-peer pick can be stored with a first user identifier ("ID") associated with the first user and a placeholder ID that serves as placeholder data until a second user accepts the peer-to-peer pick. The peer-to-peer pick data can then be transmitted to the user interface generator at (3). The user interface generator 122 can generate user interface data that, when rendered by a second user device 102B, causes the second user device 102B to display a user interface depicting an invitation to accept the peer-to-peer pick at (4). This user interface can be, for example, an invitation to accept the peer-to-peer pick on a pick page of the second user, an invitation to accept the peer-to-peer pick in an inbox of the second user, and/or an invitation to accept the peer-to-peer pick on the second user's social feed. The peer-to-peer pick generated by the user interface generator 122 can include, for example, an acceptance button and/or an acceptance slider and/or another user interface element. The user interface data can then be transmitted to the second user device 102B at (5).

After transmitting the user interface data to the second user device 102B, the second user can accept the peer-to-peer pick on the second user device 102B at (6). The second user can accept the peer-to-peer pick, for example, by choosing the acceptance button or sliding the acceptance slider. Accepting the peer-to-peer pick can cause the second user device 102B to transmit acceptance data to the concurrency resolution system(s) 127 at (7).

The concurrency resolution system(s) 127 can check for and retrieve acceptance flag data associated with the peer-to-peer pick from the placed pick data store 125 at (8). If the concurrency resolution system(s) 127 detects that there is acceptance flag data in the placed data store 125 then the peer-to-peer pick may have already been accepted by a different user and the second user may not accept the peer-to-peer pick. In some embodiments, the user interface generator 122 may generate user interface data (not shown) that, when rendered by the second user device 102B, cause the second user device 102B to indicate to the second user that the peer-to-peer pick has already been accepted and may no longer be accepted and transmit this data (not shown) to the second user device 102B.

If the concurrency resolution system(s) 127 does not detect acceptance flag data associated with the peer-to-peer pick in the placed pick data store 125, then the concurrency resolution system(s) 127 may transmit acceptance flag data associated with the peer-to-peer pick to the placed pick data store 125 at (9) and the placed pick data store 125 may store the acceptance flag data associated with the peer-to-peer pick. In embodiments where the peer-to-peer pick data was stored with a placeholder ID in the placed pick data store at (2), the peer-to-peer pick data can be updated to replace the placeholder ID with a second user ID associated with the second user at (10).

Optionally, in some embodiments not shown, the concurrency resolution system(s) 127 may cache recent acceptance data (e.g., acceptance flag data that indicates which peer-to-peer picks have an acceptance flag stored in association therewith in the placed pick data store 125) in a local cache for a period of time, for example, five minutes, ten minutes, thirty minutes or a longer or a shorter period of time. The concurrency resolution system(s) 127 can, upon receiving acceptance data at (7), first check the local cache to determine if the peer-to-peer pick has already been accepted (e.g., check the local cache to determine if an acceptance flag was already stored in the placed pick data store 125 in association with the peer-to-peer pick) prior to checking the placed pick data store at (8). Checking a local cache can be faster than checking the placed pick data store 125 given that the placed pick data store 125 may have a larger storage capacity and therefore performing a query of the placed pick data store 125 may take more time than a similar query performed on a local cache and/or given that the placed pick data store 125 may be accessible via a network (e.g., the network 110) and packet transmissions to and/or from the placed pick data store 125 can introduce additional latency. Thus, checking the local store prior to checking the placed pick data store 125 can have the advantage of decreasing latency for determining if the peer-to-peer pick has been accepted and minimize operational network traffic.

After transmitting acceptance data to the placed pick store 125, the concurrency resolution system(s) 127 can transmit acceptance data to the user entries data store 126 and the user interface generator 122 at (11). The user entries data store 126 can then update first user entries data and second user entries data based on the number of entries associated with the peer-to-peer pick at (12). In some embodiments (not shown), the user interface generator 122 can generate user interface data that, when rendered by the first user device 102A and the second user device 102B, causes the first user device 102A and the second user device 102B to display a user interface depicting the change in the entries data of the respective user.

After receiving the acceptance data, the user interface generator 122 can generate user interface data that, when rendered by the first user device 102A and the second user device 102B, causes the first user device 102A and the second user device 102B to indicate that the peer-to-peer pick has been accepted at (13). The user interface generator 122 can then transmit the user interface data to the first user device 102A and the second user device 102B at (14).

Optionally, and not shown in the drawings, the peer-to-peer pick processing system 124 can use the trained peer-to-peer machine learning model to determine how to organize peer-to-peer picks that are displayed in a user's feed and/or the trained peer-to-peer recommendation machine learning model to recommend to a user how to change the user's peer-to-peer pick to improve the likelihood that the peer-to-peer pick is accepted by another user.

Example User Interfaces

Figure 4:
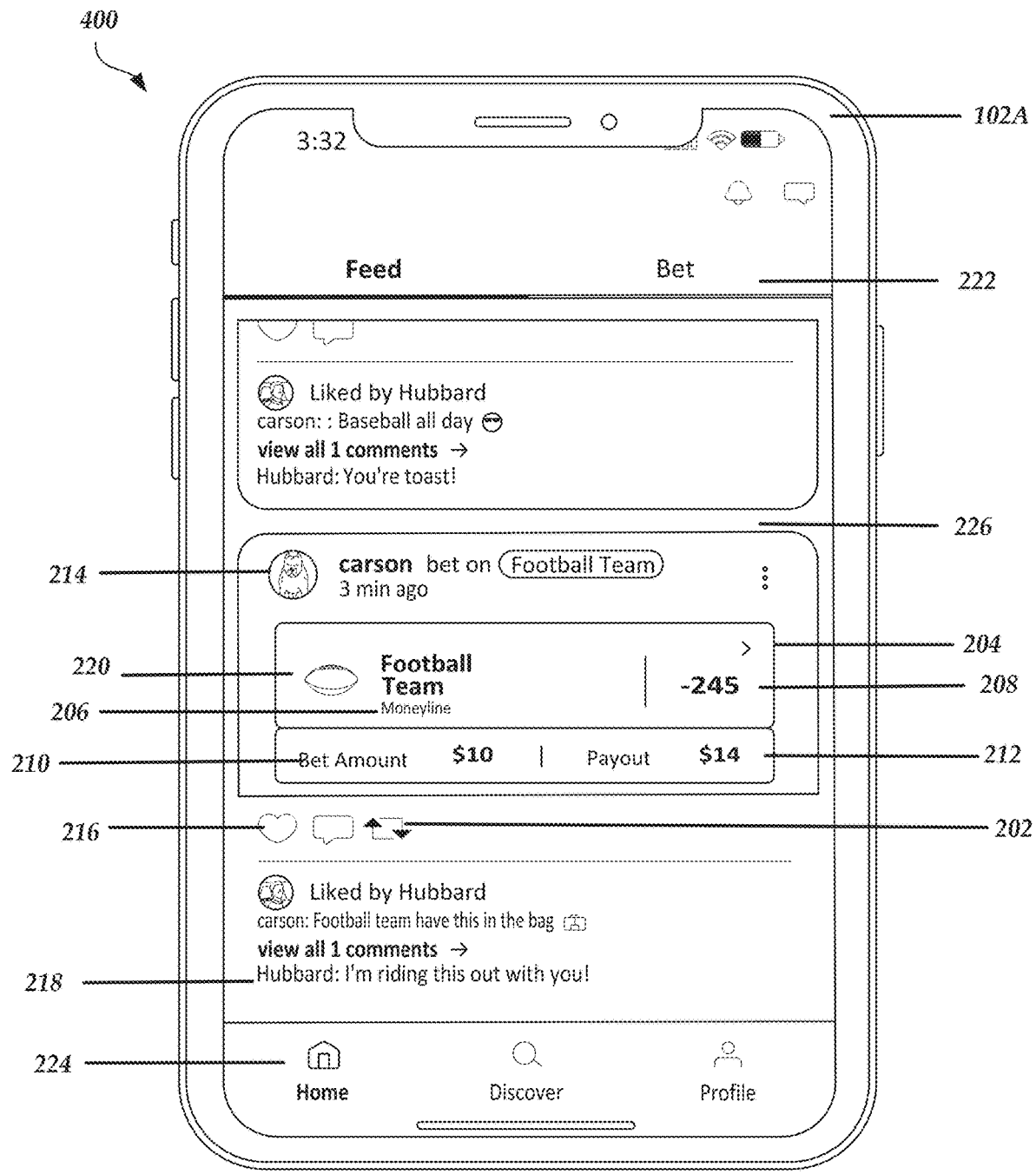
FIG. 4 illustrates an example user interface depicting a pick posted to a user feed that can be duplicated by the user.

FIG. 4 illustrates an example user interface 400 depicting a pick 204 published to the social feed 226 of a follower than can be duplicated. When a first user or "publisher" places a pick 204, user interface data can be generated by the user interface generator 122 and can be transmitted to the second user device 102B so that, when rendered by the second user device 102B, causes the second user device 102B to display the pick 204 on a user social feed 226 of any user that is a "follower" of the publisher.

As illustrated in FIG. 4 the user interface 400 can be displayed on the user device 102 and can include a duplicate pick button 202, a pick 204, an indication of the type of pick 206 (e.g., moneyline, over/under, spread), an indication of the pick odds 208, and indication of the pick amount 210 and payout 212 for a successful pick, a user account 214 associated with the pick 204 (e.g., the user that placed the pick), social interaction buttons 216 (or other user interface elements), a comments thread 218 associated with the pick 204, and indication of the chosen outcome 220 associated with the pick 204 an interface toggle 222, a page toggle 224, and a user social feed 226.

As explained herein, when a first user places a pick 204, the pick 204 is published onto the user social feed 226 of all users that are followers of the first user or publisher. A user can become a follower of a user/publisher by, for example, clicking the user account 214 of a user/publisher to navigate to a user profile (not shown) associated with the user account

214 and clicking, for example, a follow button (or selecting another user interface element).

When a pick 204 is published on a follower's social feed 226 as shown in FIG. 4, a follower can interact with the duplicate pick button 202 to duplicate the pick 204 as described herein. If a user interacts with the duplicate pick button 202 to duplicate the pick 204, a data field (not shown) can show up on the user interface that contains the pick terms of the pick 204, such as, the type of pick 206, the chosen outcome 220 and the pick odds 208 (which may be updated to reflect changed odds as described herein) along with a data entry field in which the follower can enter or modify a number of entries. The follower can then confirm the pick and the pick will be placed and published to the social feeds 226 of any followers of the follower who is now a second publisher of the pick 204. The pick 204 published by the second publisher that duplicated the pick that appeared on his or her social feed 226 may indicate the user account 214 of the publisher and/or the second publisher.

The social interaction buttons 216 and the comments thread 218 can allow a follower to interact with a pick that appears on their social feed 226 without duplicating the pick. For example, the social interaction buttons 216 can be used to send a "like" in association with the pick to the publisher which can indicate follower approval of the pick 204. For example, the social interaction buttons 216 can be used to place a comment on the comments thread 218. Users and followers may see comments and likes left by other users and followers.

The interface toggle 222 can be used to change the user interface between the social feed interface and a pick page (see FIG. 5A) of the digital picking platform. The page toggle 224 can be used to navigate between different pages of the current interface. For example, in the social feed interface, the user may be able to use the page toggle to navigate between the social feed 226, a discover page or the user's personal profile.

In some embodiments, picks 204 of a publisher may appear on the social feed 226 of users that are not a follower of the publisher. Those users can still interact with the pick 204 as if they were a follower of the publisher who received the pick on their social feed 226. In some embodiments, a user who is not a follower of the publisher may navigate to the user profile associated with the user account 214 of a pick. The user may locate a published pick 204 by the publisher and interact with the pick 204 as if they were a follower of the publisher who received the pick on their social feed 226.

Figure 5A:
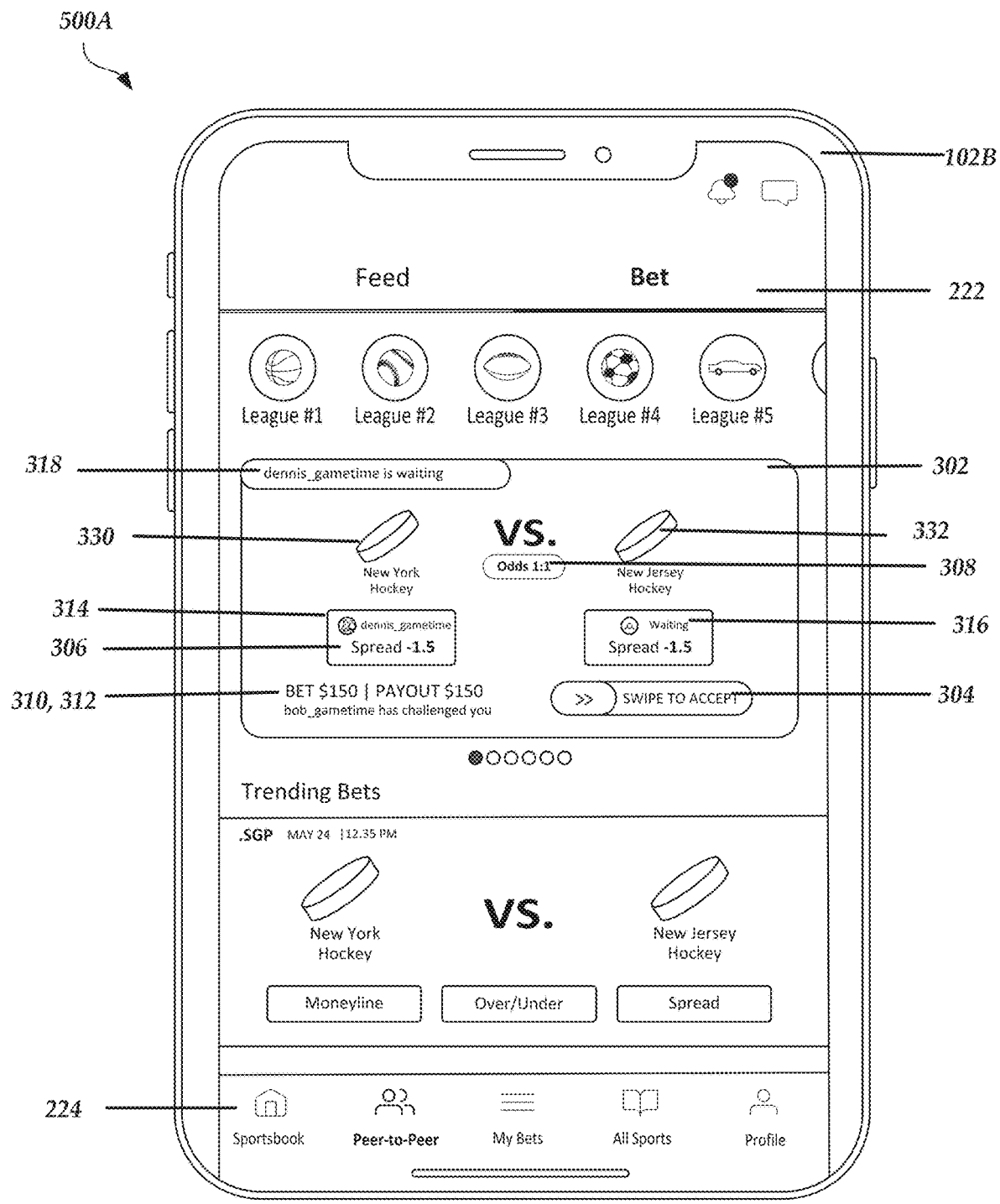
FIGS. 5A-5B illustrate an example user interface depicting a peer-to-peer pick sent by a first user pending acceptance by a second user.
Figure 5B:
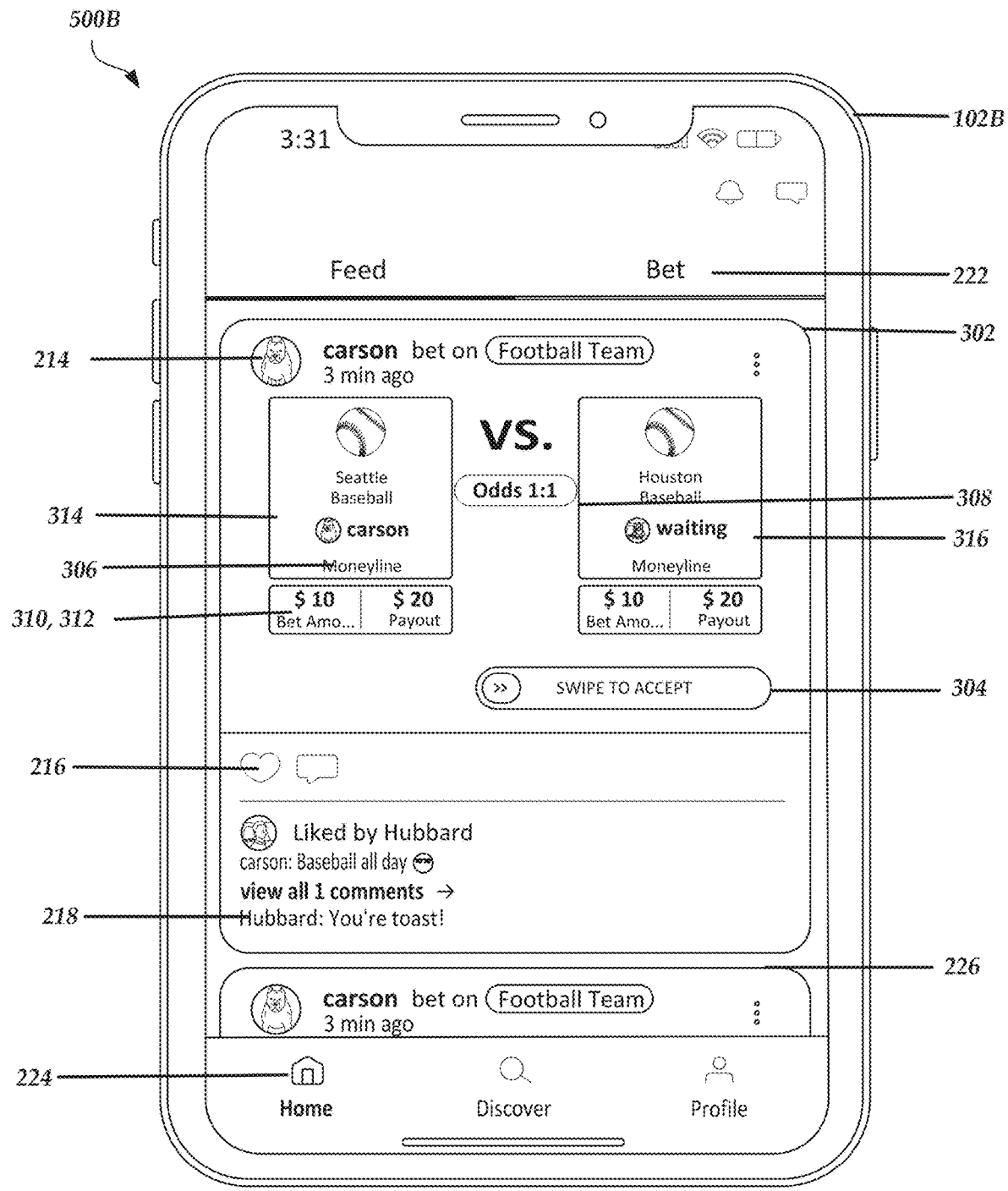

FIGS. 5A-5B illustrate an example user interfaces 500A and 500B depicting a peer-to-peer pick invitation 302. The user interfaces 500A and 500B may be rendered and displayed by a second user device 102B in response to the second user device 102B processing user interface data generated by the user interface generator 122.

As shown in FIGS. 5A-5B, the peer-to-peer pick invitation 302 can be displayed on the second user device 102B and can include an acceptance slider 304, an indication of the pick type 306 of the associated peer-to-peer pick invitation 302, the odds 308 of the associated peer-to-peer pick invitation 302, the pick amount 310 and payout amount 312 for the winner of the peer-to-peer pick 302, the first user account 314 sending the peer-to-peer pick invitation 302, the second user account 316 associated with the second user associated with the peer-to-peer pick 302 (shown in FIGS. 5A-5B as "waiting" since the peer-to-peer pick invitation 302 has not been accepted yet. Upon acceptance by the second user, this can be updated to show the second user account 316), the status 318 (e.g., pending and/or waiting, accepted, etc.,) of the peer-to-peer pick 302, and indication of the first user chosen outcome 330 and the second user chosen outcome 332 associated with the peer-to-peer pick, the interface toggle 222, the page toggle 224 and in FIG. 5B the social feed 226, the social interaction buttons 216 and the comments thread 218.

When the second user receives a peer-to-peer pick invitation 302, whether the invitation 302 was sent directly to the second user (as shown in FIG. 5A) or published on the second user's social feed 226 (as shown in FIG. 5B), the second user may interact with the acceptance slide 304 to accept the invitation. If the second accepts the invitation, the peer-to-peer pick processing system 124 will continue to process the peer-to-peer pick 302 as described herein. Although the acceptance slider 304 is shown as a slider, this is not meant to be limiting. For example, in some embodiments, the acceptance slider 304 may be depicted in the form of a button or another type of user interface element (not shown).

If the first user chooses to publish the peer-to-peer pick invitation 302 to the social feeds 226 of his or her followers, followers and other users can interact with the peer-to-peer pick 302 with the social interaction buttons 216 and comment thread 218 as described herein. Followers and other users can interact with the peer-to-peer pick 302 both prior to acceptance of the peer-to-peer pick 302 and after acceptance of the peer-to-peer pick 302.

Example Pick Duplication Process

Figure 6:
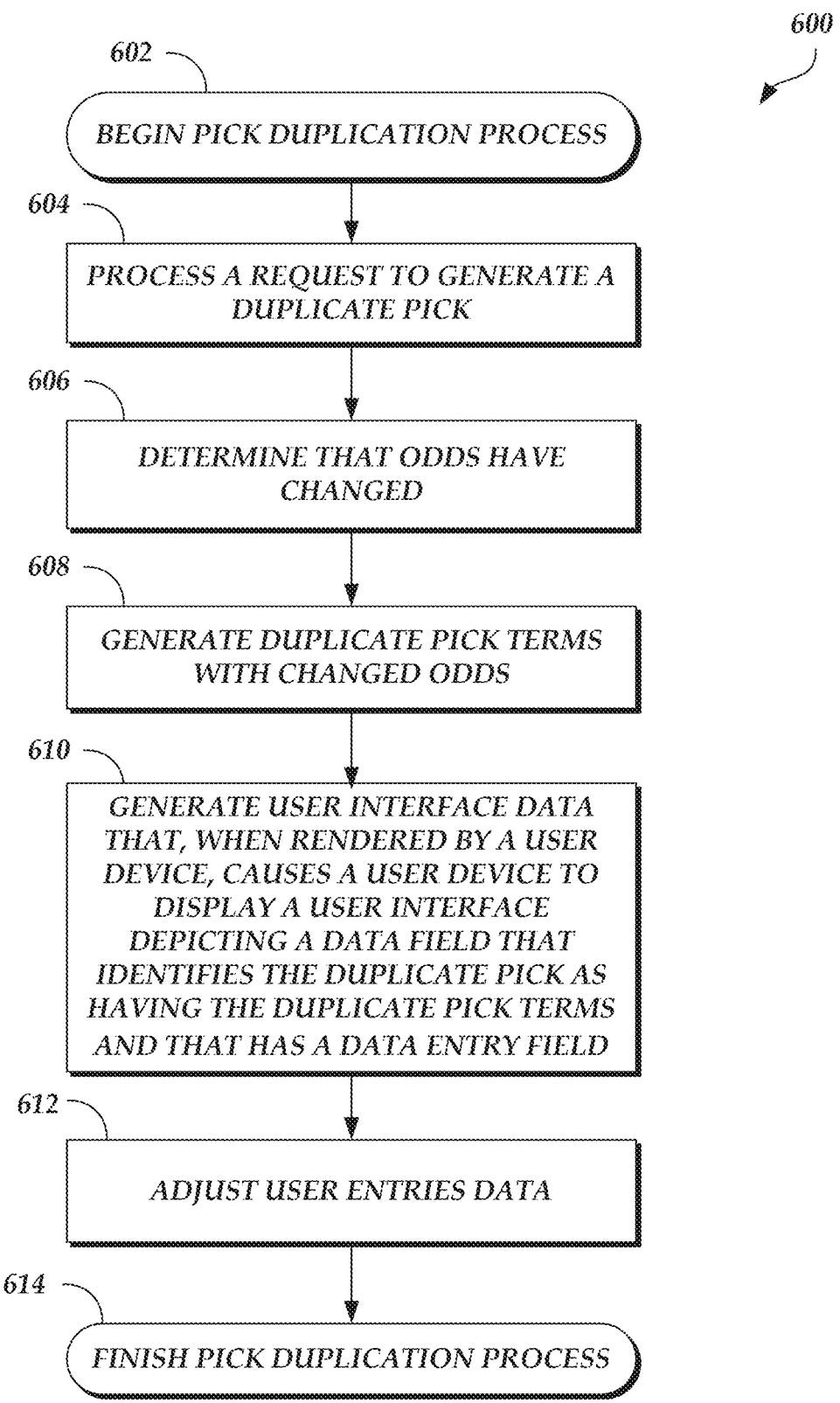
FIG. 6 is a flow diagram depicting a pick duplication routine illustratively implemented by an event pick processing system, according to one embodiment.

FIG. 6 is a flow diagram depicting a pick duplication process 600 illustratively implemented by a duplicate pick processing system of an event pick processing system, according to one embodiment. As an example, the duplicate pick processing system 123 of the event pick processing system 120 of FIG. 1 can be configured to execute the pick duplication process 600. The pick duplication process begins at block 602.

At block 604, a request to generate a duplicate pick is obtained. The pick to be duplicated can be a first placed pick at a first time and may contain one or more pick terms, such as an event and/or market, a pick type, a pick outcome, pick odds, and/or similar terms.

At block 606, it is determined if the pick odds of the first placed pick have changed at a current second time with respect to the pick odds at the first time. For example, an odds processor 121 can gather odds data from an odds feed with up-to-date odds data from an odds provider 130 and risk management data from a managed trading service 140 can be used to determine if the pick odds for the same pick terms of the first placed pick have changed.

At block 608, if the odds processor 121 has determined that the pick odds have changed, the odds processor 121 can create duplicate pick terms data that contains the same pick terms data as the first placed pick, but updated to include the changed pick odds.

At block 610, user interface data is generated that, when rendered by the user device 102, can cause the user device 102 to display a user interface that may depict a data field, for example, a pick sleeve that identifies the duplicate pick as having the changed pick odds and the user interface data can be transferred to the user device. If the current odds of the pick terms of the first pick have not changed, user interface data is generated that, when rendered by the user device 102, can cause the user device 102 to display a user interface that may depict a pick sleeve that identifies the duplicate pick as having the same odds as the first placed pick. The pick sleeve can comprise a data entry field configured for the user to enter, for example, a number of pick entries, the numerical value of which may be the same or may be different than the numerical value of the number of pick entries of the first placed pick.

At block 612, user entries data in the user entries data store 126 is adjusted based on the numerical value entered into the data entry field. After the user entries data is updated, the pick duplication process 600 ends, as shown at block 614.

Example Peer-to-Peer Pick Process

Figure 7:
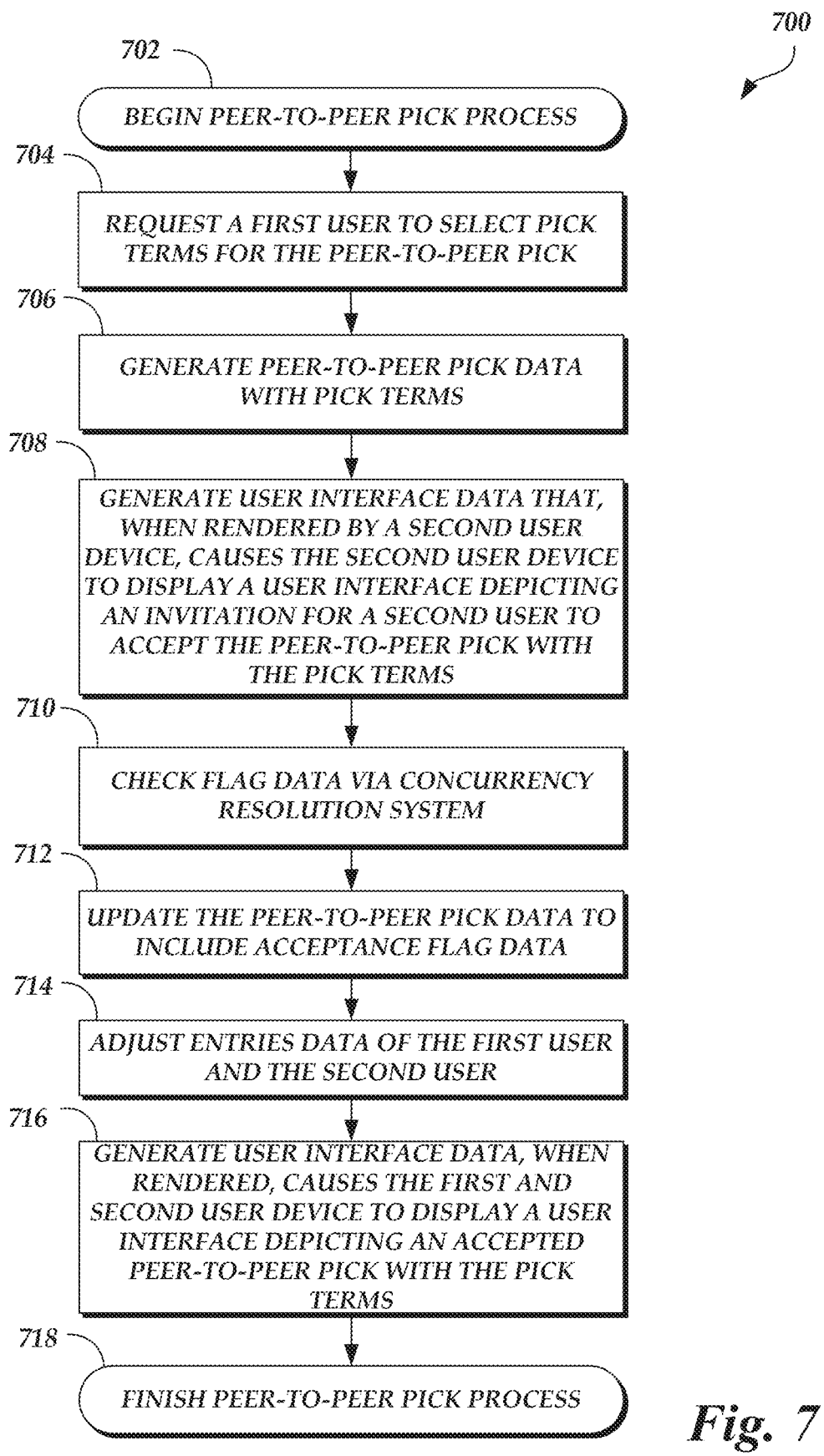
FIG. 7 is a flow diagram depicting a peer-to-peer pick routine illustratively implemented by an event pick processing system, according to one embodiment.

FIG. 7 is a flow diagram depicting a peer-to-peer pick process 700 illustratively implemented by a peer-to-peer pick processing system of an event pick processing system, according to one embodiment. As an example, the peer-to-peer pick processing system 124 of the event pick processing system 120 of FIG. 1 can be configured to execute the peer-to-peer pick process 700. The peer-to-peer pick process begins at block 702.

At block 704, a request to a first user to select pick terms for the peer-to-peer pick is made. The first user can select pick terms, such as an event and/or market, a pick type, a pick outcome, pick odds and/or similar terms.

At block 706, peer-to-peer pick terms are generated based on the pick terms selected by the first user at 704.

At block 708, user interface data can be generated that, when rendered by a second user device 102B, causes the second user device 102B to display a user interface depicting an invitation to accept the peer-to-peer pick and the user interface data can be transferred to the second user device. This user interface can be, for example, an invitation to accept the peer-to-peer pick on a pick page of the second user, an invitation to accept the peer-to-peer pick in an inbox of the second user and/or an invitation to accept the peer-to-peer pick on the second user's social feed. The peer-to-peer pick generated can include, for example, an acceptance button and/or an acceptance slider. The user interface data can then be transmitted to the second user device 102B.

At block 710 the concurrency resolution system(s) 127 can check for and retrieve acceptance flag data associated with the peer-to-peer pick from the placed pick data store 125 if the second user accepts the peer-to-peer pick. If the concurrency resolution system(s) 127 detects that there is acceptance flag data in the placed pick data store 125 then the peer-to-peer pick may have already been accepted by a different user and the second user may not accept the peer-to-peer pick.

At block 712, the concurrency resolution system(s) 127 generates acceptance flag data associated with the peer-to-peer pick and updates the placed pick data store 125 to include the acceptance flag data associated with the peer-to-peer pick if the concurrency resolution system(s) did not detect acceptance flag data associated with the peer-to-peer pick.

At block 714, first user entries data and second user entries data in the user entries data store 126 are adjusted based on the pick terms of the peer-to-peer pick.

At block 716, user interface data can be generated that, when rendered by the first user device 102A and the second user device 102B, cause the first user device 102A and the second user device 102B to indicate that the peer-to-peer pick has been accepted and the user interface data is transmitted to the first user device 102A and the second user device 102B. After the user interface data is transmitted, the pick duplication process 700 ends, as shown at block 718.

Example Easy-to-Read Lines User Interface

Figure 8:
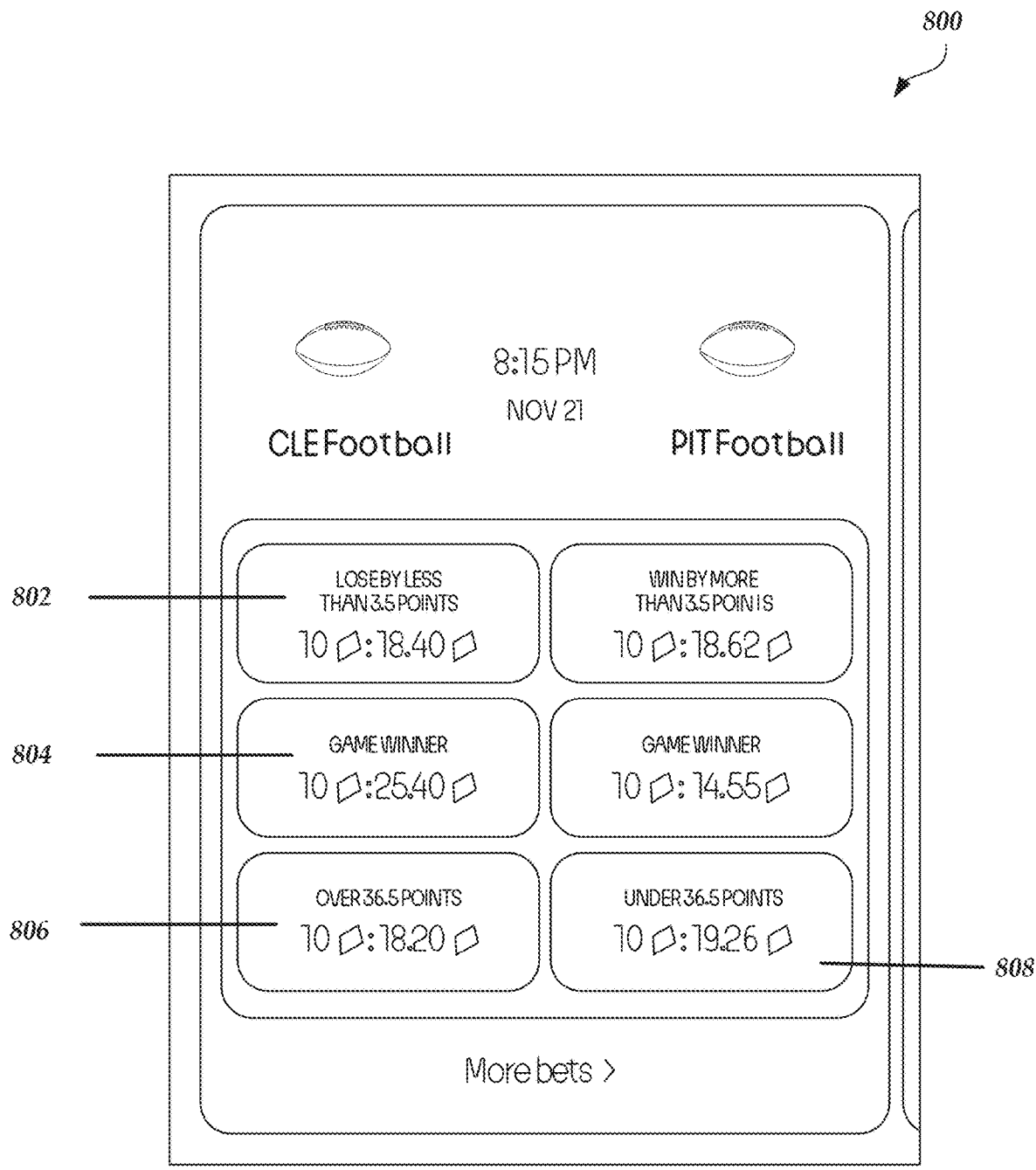
FIG. 8 illustrates an example user interface depicting picking lines and terminology with easy-to-read lines.

FIG. 8 illustrates an example user interface 800 depicting picking terminology and picking lines as easy-to-read lines 802, 804, 806, 808 through an easy-to-read lines feature as displayed on a user device 102. A user can use the easy-to-read lines feature to change terminology displayed to the user on the user device 102 between traditional event picking terminology and easy-to-read lines 802, 804, 806, 808. For example, with traditional event picking terminology, an event page may display to the user different markets for "spread" picks 802, "moneyline" picks 804 and "over"/"under" picks 806. As shown in FIG. 8, the easy-to-read lines feature can display this terminology as "LOSE BY LESS THAN 3.5 POINTS"/"WIN BY MORE THAN 3.5 POINTS" picks 802, "GAME WINNER" picks 804, and "OVER 36.5 POINTS"/"UNDER 36.5 POINTS" picks 806 respectively. Additionally, each of the markets would feature lines/odds 808 associated with the market that indicate how many additional entries a user could win based on a number of entries submitted for the pick. Examples of traditional event picking odds can be "−150," "+200," "2.2," or "⅗." With the easy-to-read lines feature, the odds 808 may instead be depicted, as shown in FIG. 8, as two numerical values. The first numerical value can indicate a reference number of entries a user can submit for the pick and the second numerical value can indicate a number of entries to be received by the user for a successful pick placed if the submitted number of entries is equal to first numerical value. For example, if a user submits ten entries for an "UNDER 36.5 POINTS" 806 pick with odds of "10:19.26" 808 as shown in FIG. 8, and the pick is successful, the user will receive 19.26 entries as depicted. This can be useful for new pickers as it may reduce the learning curve and the barrier to entry into event picking.

ADDITIONAL EMBODIMENTS

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, television, smart watch, smart glasses, and the like. A user device 102 may execute an application (e.g., a browser, a stand-alone application, etc.) that allows to place picks, including duplicate picks and peer-to-peer picks. A user device 102 can be operated by a user looking to place and/or view placed picks with respect to an event, market, and/or the like.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks.

For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An event picking system comprising:

memory storing computer-executable instructions; and a hardware processor in communication with the memory, wherein the computer-executable instructions, when executed by the hardware processor, cause the hardware processor to:

request, via a first user device, a first user to select an event pick market and to select event pick terms for the event pick market to create a challenge event pick;

in response to selection of the event pick market and the event pick terms, store data associated with the challenge event pick in a placed pick data store;

generate user interface data that, when rendered by a second user device, causes the second user device to display a user interface depicting an invitation for a second user to accept the challenge event pick;

in response to an acceptance by the second user of the challenge event pick, determine, via a concurrency resolution system, that the placed pick data store does not comprise acceptance flag data in association with the challenge event pick;

in response to the determination that the placed pick data store does not comprise the acceptance flag data in association with the challenge event pick, update the placed pick data store to include the acceptance flag data in association with the challenge event pick; and adjust entries data of the first user and of the second user based on the event pick terms of the challenge event pick.

2. The event picking system of claim 1, wherein the concurrency resolution system caches an indication that the acceptance flag data is stored in association with the challenge event pick in a cache local to the concurrency resolution system.

3. The event picking system of claim 2, wherein the computer-executable instructions, when executed, further cause the hardware processor to:

in response to an acceptance by a third user of the challenge event pick, query the local cache to determine whether the acceptance flag data is stored in association with the challenge event pick in the placed pick data store.

4. The event picking system of claim 2, wherein the indication stored in the local cache is stored for a threshold period of time, and wherein the computer-executable instructions, when executed, further cause the hardware processor to:

delete the indication stored in the local cache in response to the indication being stored in the local cache for the threshold period of time.

5. The event picking system of claim 1, wherein the computer-executable instructions, when executed, further cause the hardware processor to:

request, via the first user device, the first user to one of send the invitation for the second user to accept the challenge event pick directly to the second user or publish the invitation for the second user to accept the challenge event pick on a social feed of a follower of the first user.

6. The event picking system of claim 1, wherein a first user identifier associated with the first user is included in data associated with the challenge event pick stored in the placed pick data store, and wherein the computer-executable instructions, when executed, further cause the hardware processor to:

in response to updating the placed pick data store to include the acceptance flag data in association with the challenge event pick, update the data associated with the challenge event pick stored in the placed pick data store to include a second user identifier associated with the second user.

7. A computer-implemented method comprising:

as implemented by one or more computing devices configured with specific computer-executable instructions, requesting, via a first user device, a first user to select an event pick market and to select event pick terms for the event pick market to create a challenge event pick;

in response to selection of the event pick market and the event pick terms, generating user interface data that, when rendered by a second user device, causes the second user device to display a user interface depicting an invitation for a second user to accept the challenge event pick;

in response to an acceptance by the second user of the challenge event pick, determining, via a concurrency resolution system, that a placed pick data store does not comprise acceptance flag data in association with the challenge event pick;

in response to the determination that the placed pick data store does not comprise the acceptance flag data in association with the challenge event pick, updating the placed pick data store to include the acceptance flag data in association with the challenge event pick; and adjusting entries data of the first user and of the second user based on the event pick terms of the challenge event pick.

8. The computer-implemented method of claim 7, wherein the concurrency resolution system caches an indication that the acceptance flag data is stored in association with the challenge event pick in a cache local to the concurrency resolution system.

9. The computer-implemented method of claim 8, wherein the method further comprises:

in response to an acceptance by a third user of the challenge event pick, querying the local cache to determine whether the acceptance flag data is stored in association with the challenge event pick in the placed pick data store.

10. The computer-implemented method of claim 8, wherein the indication stored in the local cache is stored for a threshold period of time, and wherein the method further comprises:

deleting the indication stored in the local cache in response to the indication being stored in the local cache for the threshold period of time.

11. The computer-implemented method of claim 7, wherein the method further comprises:

requesting, via the first user device, the first user to one of send the invitation for the second user to accept the challenge event pick directly to the second user or publish the invitation for the second user to accept the challenge event pick on a social feed of a follower of the first user.

12. The computer-implemented method of claim 7, wherein the method further comprises:
  in response to selection of the event pick market and the event pick terms, storing data associated with the challenge event pick in a placed pick data store.

13. The computer-implemented method of claim 12, wherein a first user identifier associated with the first user is included in data associated with the challenge event pick stored in the placed pick data store, and wherein the method further comprises:
  in response to updating the placed pick data store to include the acceptance flag data in association with the challenge event pick, updating the data associated with the challenge event pick stored in the placed pick data store to include a second user identifier associated with the second user.

14. Non-transitory, computer-readable storage media comprising computer-executable instructions, wherein the computer-executable instructions, when executed by a computer system, cause the computer system to:
  request, via a first user device, a first user to select an event pick market and to select event pick terms for the event pick market to create a challenge event pick;
  in response to selection of the event pick market and the event pick terms, generate user interface data that, when rendered by a second user device, causes the second user device to display a user interface depicting an invitation for a second user to accept the challenge event pick;
  in response to an acceptance by the second user of the challenge event pick, determine, via a concurrency resolution system, that a placed pick data store does not comprise acceptance flag data in association with the challenge event pick;
  in response to the determination that the placed pick data store does not comprise the acceptance flag data in association with the challenge event pick, update the placed pick data store to include the acceptance flag data in association with the challenge event pick; and
  adjust entries data of the first user and of the second user based on the event pick terms of the challenge event pick.

15. The non-transitory, computer-readable storage media of claim 14, wherein the concurrency resolution system caches an indication that the acceptance flag data is stored in association with the challenge event pick in a cache local to the concurrency resolution system.

16. The non-transitory, computer-readable storage media of claim 15, wherein the computer-executable instructions, when executed, further cause the computer system to:
  in response to an acceptance by a third user of the challenge event pick, query the local cache to determine whether the acceptance flag data is stored in association with the challenge event pick in the placed pick data store.

17. The non-transitory, computer-readable storage media of claim 15, wherein the indication stored in the local cache is stored for a threshold period of time, and wherein the computer-executable instructions, when executed, further cause the computer system to:
  delete the indication stored in the local cache in response to the indication being stored in the local cache for the threshold period of time.

18. The non-transitory, computer-readable storage media of claim 14, wherein the computer-executable instructions, when executed, further cause the computer system to:
  request, via the first user device, the first user to one of send the invitation for the second user to accept the challenge event pick directly to the second user or publish the invitation for the second user to accept the challenge event pick on a social feed of a follower of the first user.

19. The non-transitory, computer-readable storage media of claim 14, wherein the computer-executable instructions, when executed, further cause the computer system to:
  in response to selection of the event pick market and the event pick terms, store data associated with the challenge event pick in a placed pick data store.

20. The non-transitory computer-readable storage of claim 19, wherein a first user identifier associated with the first user is included in data associated with the challenge event pick stored in the placed pick data store, and wherein the computer-executable instructions, when executed, further cause the computer system to:
  in response to updating the placed pick data store to include the acceptance flag data in association with the challenge event pick, update the data associated with the challenge event pick stored in the placed pick data store to include a second user identifier associated with the second user.

* * * * *